US009805248B2

(12) United States Patent
Brieu

(10) Patent No.: US 9,805,248 B2
(45) Date of Patent: Oct. 31, 2017

(54) APPLYING PIXELWISE DESCRIPTORS TO A TARGET IMAGE THAT ARE GENERATED BY SEGMENTING OBJECTS IN OTHER IMAGES

(71) Applicant: Definiens AG, Munich (DE)

(72) Inventor: Nicolas Brieu, Munich (DE)

(73) Assignee: Definiens AG, Munich (DE)

( * ) Notice: Subject to any disclaimer, the term of this patent is extended or adjusted under 35 U.S.C. 154(b) by 50 days.

(21) Appl. No.: 14/952,982

(22) Filed: Nov. 26, 2015

(65) Prior Publication Data
US 2016/0098589 A1    Apr. 7, 2016

Related U.S. Application Data

(63) Continuation-in-part of application No. 14/473,096, filed on Aug. 29, 2014.

(51) Int. Cl.
*G06K 9/00* (2006.01)
*G06K 9/46* (2006.01)
(Continued)

(52) U.S. Cl.
CPC ....... *G06K 9/0014* (2013.01); *G06K 9/00147* (2013.01); *G06K 9/4642* (2013.01);
(Continued)

(58) Field of Classification Search
CPC ........... G06F 17/2785; G06F 17/30864; G06F 17/30731; G06F 17/30734;
(Continued)

(56) References Cited

U.S. PATENT DOCUMENTS

| 4,620,154 A | 10/1986 | Inouye ......................... 324/309 |
| 7,995,864 B2 | 8/2011 | Mullick et al. ............... 382/294 |

(Continued)

OTHER PUBLICATIONS

DiFranco et al., Ensemble based system for whole-slide prostate cancer probability mapping using color texture features, Oct.-Dec. 2011 [retrieved 6/9/217], Computerized Medical Imaging and Graphics, vol. 35, Issues 7-8,pp. 629-645. Retrieved from the Internet: http://www.sciencedirect.com/science/article/pii/S0895611110001369.*

(Continued)

*Primary Examiner* — Andrew Moyer
*Assistant Examiner* — Dennis Rosario
(74) *Attorney, Agent, or Firm* — Imperium Patent Works; Darien K. Wallace

(57) ABSTRACT

Both pixel-oriented analysis and the more accurate yet slower object-oriented analysis are used to recognize patterns in images of stained cancer tissue. Images of tissue from other patients that are similar to tissue of a target patient are identified using the standard deviation of color in the images. Object-oriented segmentation is then used to segment small portions of the images of the other patients into object exhibiting object characteristics. Pixelwise descriptors associate each pixel in the remainder of the images with object characteristics based on the color of pixels at predetermined offsets from the characterized pixel. Pixels in the image of the target patient are assigned object characteristics without performing the slow segmentation of the image into objects. A pixel heat map is generated from the target image by assigning pixels the color corresponding to the object characteristic that the pixelwise descriptors indicate is most likely associated with each pixel.

20 Claims, 25 Drawing Sheets

(51) Int. Cl.
*G06K 9/66* (2006.01)
*G06K 9/62* (2006.01)

(52) U.S. Cl.
CPC ......... *G06K 9/4652* (2013.01); *G06K 9/6277* (2013.01); *G06K 9/66* (2013.01)

(58) Field of Classification Search
CPC .......... Y10S 707/99945; G06K 9/4642; G06K 9/4676; G06K 9/4671; G06T 7/0012; G06T 7/11; G06T 2207/20021; G06T 2207/30004
See application file for complete search history.

(56) References Cited

U.S. PATENT DOCUMENTS

| | | | | |
|---|---|---|---|---|
| 8,064,679 B2* | 11/2011 | Griffin | ............... | G06K 9/00127 382/128 |
| 8,139,831 B2 | 3/2012 | Khamene et al. | ............ | 382/128 |
| 8,165,425 B2 | 4/2012 | DeClerck | ...................... | 382/294 |
| 8,200,316 B2 | 6/2012 | Keppel et al. | ................. | 600/436 |
| 8,243,194 B2* | 8/2012 | Ozdemir | ............... | G06T 3/4007 348/169 |
| 8,319,793 B2 | 11/2012 | Schaepe et al. | ............. | 345/619 |
| 8,620,086 B2 | 12/2013 | Lam et al. | .................... | 382/190 |
| 8,699,769 B2 | 4/2014 | Schoenmeyer et al. | ...... | 382/128 |
| 2003/0208116 A1 | 11/2003 | Liang et al. | .................. | 600/407 |
| 2005/0190955 A1 | 9/2005 | Brown | .......................... | 382/128 |
| 2008/0008349 A1 | 1/2008 | Binnig et al. | ................. | 382/100 |
| 2008/0144013 A1 | 6/2008 | Lanoue et al. | ................. | 356/73 |
| 2010/0172556 A1 | 7/2010 | Cohen et al. | ................. | 382/128 |
| 2010/0183213 A1 | 7/2010 | Keppel et al. | ................. | 382/131 |
| 2010/0215227 A1 | 8/2010 | Grunkin et al. | .............. | 382/128 |
| 2010/0265267 A1 | 10/2010 | Schaepe et al. | .............. | 345/619 |
| 2012/0226709 A1 | 9/2012 | Bhargava et al. | ............. | 707/769 |
| 2013/0016886 A1 | 1/2013 | Schoenmeyer et al. | ...... | 382/128 |
| 2013/0034202 A1 | 2/2013 | Keppel et al. | ................... | 378/37 |
| 2013/0170726 A1 | 7/2013 | Kaufman et al. | ............. | 382/131 |
| 2014/0073907 A1 | 3/2014 | Kumar et al. | ................. | 600/414 |
| 2014/0185891 A1* | 7/2014 | Schoenmeyer | ....... | G06T 7/0012 382/128 |
| 2014/0228707 A1 | 8/2014 | Brieu et al. | .................... | 600/567 |
| 2014/0378500 A1 | 12/2014 | Cohen et al. | ................. | 514/291 |

OTHER PUBLICATIONS

Gudla et al., A High-Throughput System for Segmenting Nuclei Using Multiscale Techniques, Mar. 13, 2008 [retrieved Jun. 9, 2017], Cytometry Part A: Journal of the International Society for Advancement of Cytometry, vol. 73A, Issue: 5,pp. 451-466. Retrieved from the Internet: http://onlinelibrary.wiley.com/doi/10.1002/cyto.a.20550/full.*
Bueno et al., "Colour Model Analysis 9 for Histopathology Image Processing," Color Medical Image Analysis, Springer Jan. 1, 2013 XP055264084 pp. 165-180 (16 pages).
Havaei et al., "Efficient Interactive Brain Tumor Segmentation as Within-Brain kNN Classification," Int'l Conf. on Pattern Recognition, IEEE Computer Society, Aug. 24, 2014 XP032698227 ISSN: 1051-4651 pp. 556-561 (6 pages).
Schroff et al., "Object Class Segmentation Using Random Forests," Proceedings of the British Machine Vision Conference, Jan. 1, 2008 XP055264531 ISBN: 978-1-901725-36-0 (10 pages).
European Search Report dated Apr. 21, 2016 by the European Patent Office in the European patent application EP15178864.3 that claims priority to the parent of this application (12 pages).

* cited by examiner

| TILE # | AVERAGE L | AVERAGE a | AVERAGE b |
|---|---|---|---|
| 1 | 174.4010000 | 130.6602594 | 115.1157916 |
| 2 | 175.7951545 | 130.5271071 | 116.1030000 |
| 3 | 176.2792512 | 130.5272329 | 115.9093178 |
| 4 | 175.6151160 | 130.4810000 | 114.9636398 |
| 5 | 176.7091924 | 130.5313816 | 115.6762041 |
| 6 | 173.7306259 | 130.6907429 | 114.6651430 |
| 7 | 175.8813085 | 130.4962931 | 115.2138497 |
| 8 | 175.1332417 | 130.6254754 | 114.6712151 |
| 9 | 178.9018679 | 130.2702006 | 115.6802951 |
| 10 | 178.5394458 | 130.1857981 | 115.7240000 |
| STANDARD DEVIATION | 1.5500 | 0.1524 | 0.4881 |

FOR SECOND TILE — 130

FOR SIXTH TILE — 131

STANDARD DEVIATION VECTOR = {1.5500, 0.1524, 0.4881}

$\ell\text{\^{}}2$ EUCLIDEAN NORM $= \sqrt{L^2 + a^2 + b^2} = 1.6322$

FIG. 25

| TILE # | AVERAGE L | AVERAGE a | AVERAGE b | |
|---|---|---|---|---|
| 1 | 150.8382038 | 133.9234707 | 108.0896804 | FOR SECOND TILE ← 136 |
| 2 | 144.3023395 | 135.1960000 | 105.3256281 | |
| 3 | 161.2600000 | 132.4848967 | 110.8790000 | |
| 4 | 170.9163550 | 131.8148249 | 114.0486438 | |
| 5 | 141.2802557 | 135.7296500 | 104.3742055 | |
| 6 | 149.0611123 | 134.5668599 | 106.3385647 | |
| 7 | 165.8887226 | 131.6745972 | 112.5408871 | |
| 8 | 167.7346787 | 132.0205444 | 113.2311206 | FOR TENTH TILE ← 137 |
| 9 | 183.2640000 | 129.7647184 | 118.7850000 | |
| 10 | 182.2854716 | 130.7586227 | 118.3554767 | |
| STANDARD DEVIATION | 14.230 | 1.872 | 4.871 | |

STANDARD DEVIATION VECTOR = {14.230, 1.872, 4.871}

$\ell^{\wedge}2$ EUCLIDEAN NORM $= \sqrt{L^2 + a^2 + b^2} = 15.1567$

US 9,805,248 B2

APPLYING PIXELWISE DESCRIPTORS TO A TARGET IMAGE THAT ARE GENERATED BY SEGMENTING OBJECTS IN OTHER IMAGES

CROSS REFERENCE TO RELATED APPLICATION

This application is a continuation-in-part of, and claims priority under 35 U.S.C. §120 from, nonprovisional U.S. patent application Ser. No. 14/473,096 entitled "Learning Pixel Visual Context from Object Characteristics to Generate Rich Semantic Images," filed on Aug. 29, 2014, the subject matter of which is incorporated herein by reference.

TECHNICAL FIELD

The present invention relates generally to analyzing target patterns in digital images, and more specifically to a computer-implemented system for detecting and measuring those target patterns.

BACKGROUND

Cancer is typically diagnosed by analyzing stained samples of tissue from cancer patients and then correlating target patterns in the tissue samples with grading and scoring methods for different kinds of cancers. For example, the Gleason grading system indicates the malignancy of prostate cancer based on the architectural pattern of the glands of a stained prostate tumor. In addition, breast cancer can be diagnosed by grading stained breast tissue using the Allred score, the Elston-Ellis score or the HercepTest™ score. The Allred score indicates the severity of cancer based on the percentage of cells that have been stained to a certain intensity by the estrogen receptor (ER) antibody. The Elston-Ellis score indicates the severity of cancer based on the proportion of tubules in the tissue sample, the similarity of nucleus sizes and the number of dividing cells per high power field of 400× magnification. The HercepTest™ score indicates the severity of cancer based on the level of HER2 protein overexpresssion as indicated by the degree of membrane staining. The Fuhrman nuclear grading system indicates the severity of renal cell carcinoma (RCC) based on the morphology of the nuclei of kidney cells.

But the various cancer scoring and grading systems can deliver inconsistent results because even an experienced pathologist may misjudge the target patterns and structures in the stained tissue due to fatigue and loss of concentration. Therefore, computer-assisted image analysis systems have been developed to support pathologists in the tedious task of grading and scoring digital images of the stained tissue samples. The digital images are rectangular arrays of pixels. Each pixel is characterized by its position in the array and a plurality of numerical pixel values associated with the pixel. The pixel values represent color or grayscale information for various image layers. For example, grayscale digital images are represented by a single image layer, whereas RGB images are represented by three color image layers. Some existing image analysis systems apply semantic networks to analyze the contents of the digital images. These systems segment, classify and quantify objects present in the images by generating semantic networks that link pixel values to data objects according to class networks. The image analysis systems that apply semantic networks perform object-oriented analysis, as opposed to solely statistical pixel-oriented analysis. Consequently, semantic network systems classify not just pixels, but also the data objects linked to the pixels. The data objects that are linked to the pixels and to one another represent information about the digital images.

Although object-oriented image analysis can provide better results for cancer scoring and grading systems than can pixel-oriented analysis alone, object-oriented analysis is also more computationally involved. Therefore, object-oriented analysis is often slower than statistical pixel-oriented analysis alone. Particularly in digital pathology where each tissue slide can generate gigapixels of data, performing a full-scale object-oriented analysis is too time-consuming. A method is sought that retains the advantages of object-oriented analysis, yet enhances the performance of analysis systems based on computer-implemented semantic networks. Such a method would efficiently manage the computational resources of the object-oriented image analysis systems.

SUMMARY

Both object-oriented analysis and the faster pixel-oriented analysis are used to recognize patterns in an image of stained tissue. Object-oriented image analysis is used to segment a small portion of the image into object classes. Then the object class to which each pixel in the remainder of the image most probably belongs is determined using decision trees with pixelwise descriptors. The pixels in the remaining image are assigned object classes without segmenting the remainder of the image into objects. After the small portion is segmented into object classes, characteristics of object classes are determined. The pixelwise descriptors describe which pixels are associated with particular object classes by matching the characteristics of object classes to the comparison between pixels at predetermined offsets. A pixel heat map is generated by giving each pixel the color assigned to the object class that the pixelwise descriptors indicate is most probably associated with that pixel An image analysis method uses both object-oriented analysis and the faster pixel-oriented analysis to recognize patterns in a digital image of a stained tissue slice. Object-oriented image analysis is used to segment a small portion of the image into object classes. Then the object class to which each pixel in the remainder of the image most probably belongs is determined using decision trees that include pixelwise descriptors. The pixels of the remainder of the image are assigned object classes without segmenting the remainder of the image into objects of a semantic network. After the small portion of the image is segmented into object classes, class characteristics of each of the classes of objects are determined. The pixelwise descriptors as applied in decision trees describe which pixels are associated with particular classes of objects by matching the characteristics of the object classes to the comparison between pixels at predetermined offsets. A pixel heat map is generated by giving each pixel the color assigned to the class of objects that the pixelwise descriptors indicate is most probably associated with that pixel.

An image analysis method trains decision trees of pixelwise descriptors to indicate the probability that individual pixels in one portion of an image exhibit object characteristics determined by segmenting another portion of the image using the more computationally intensive object-oriented image analysis. A high-resolution digital image of stained tissue is first divided into tiles, and the degree of local contrast in each of the tiles is determined. A first plurality of the tiles is selected that exhibits the greatest degree of local contrast. The average color of each of the first plurality of tiles is determined. The first plurality of tiles is then divided into clusters of tiles having similar colors. A learning tile from each color cluster of tiles is selected. Each learning tile has the greatest degree of local contrast from among the tiles of the color cluster to which the learning tile belongs.

The learning tiles are then segmented into objects using computationally intensive object-oriented image analysis that generates rich semantic images. As part of the object-oriented segmentation, the objects are classified into classes of objects, and a color is associated with each class of objects. Characteristics of the objects that belong to distinct object classes are determined. Some examples of the object characteristics are: the average number of concavities of the objects of the class, the average size of the objects of the class, the variation in sizes among the objects of the class, the amount of intensity variation within the objects of the class, the elliptical fit of the objects of the class, and the average intensity of the objects of the class. Pixelwise descriptors in decision trees are generated that indicate the class of objects to which each characterized pixel of the learning tiles most probably belongs by matching the object characteristics to a comparison between the characterized pixel and a second pixel at a predetermined offset. The comparison between pixels provides the visual context for matching each pixel to an object class. Examples of the pixelwise descriptors include: the difference between a color value of the characterized pixel and of a second pixel at a predetermined offset, the average of the color values of pixels in a box of predetermined size at a predetermined offset from the characterized pixel, the standard deviation among the color values of pixels in a box of predetermined size at a predetermined offset from the characterized pixel, the sum of gradient magnitude of the color values of pixels in a box of predetermined size at a predetermined offset from the characterized pixel, the orientation of a gradient edge at a predetermined offset, and the color value of a second pixel at a predetermined offset.

By applying the pixelwise descriptors to each pixel of the digital image, including pixels outside the learning tiles, a pixel heat map is generated in which each pixel is assigned the color associated with the class of objects to which that pixel most probably belongs. The pixel heat map is generated without again segmenting the digital image into objects. The pixel heat map is then displayed on a graphical user interface.

In another embodiment, object characteristics are determined of objects segmented in a first portion of an image using object-oriented image analysis. Pixelwise descriptors then describe which of the object characteristics that a characterized pixel most probably exhibits based on a quality of a second pixel at a predetermined offset from the characterized pixel. Thus, each characterized pixel is matched to the most probable of selected object characteristics as opposed to the most probable of selected object classes. A pixel heat map is generated by applying the pixelwise descriptors to each pixel in a second portion of the image without segmenting the second portion of the image into objects. Each pixel of the second portion of the image has the color assigned to the object characteristic most probably exhibited by that pixel.

In another embodiment, a higher level heat map is generated from the pixel heat map that assigns a color to each pixel depending on the degree to which an object characteristic is most likely exhibited at the location of the pixel. An average value of multiple pixels of the pixel heat map can be combined to form a single pixel of the higher level heat map. The shade of each pixel of the higher level heat map indicates an area of the original image in which the objects exhibit an object characteristic to a particular degree. For example, the shade of each pixel of the higher level heat map could indicate a location in the original image in which cells have a higher proportion of their membranes immunohistochemically stained. In another example, the shade of each pixel of the higher level heat map could indicate a location in the original image in which the nuclei have an above-average size. Thus, pixels of the higher level heat map most probably belonging to areas in the original image containing larger nuclei are assigned a particular color.

In another embodiment, both faster pixel-oriented analysis and the more accurate yet slower object-oriented analysis are used to recognize patterns in images of stained cancer tissue. Images of tissue from other cancer patients that are most similar to the tissue of a target patient are identified using the mean and standard deviation of color within intermediate contrast regions in the images. Computationally intensive object-oriented segmentation is then used to segment small portions of the images of the other patients into object classes, and characteristics of those object classes are determined. Pixelwise descriptors associate each pixel in the remainder of the images with object characteristics based on the color and intensity of pixels at predetermined offsets from the characterized pixel. The pixels in the image of the target patient are assigned object characteristics without performing the slow segmentation of the target image into objects. A pixel heat map is generated from the image of the tissue of the target patient by giving each pixel the color assigned to the object characteristic that the pixelwise descriptors indicate is most probably associated with that pixel.

The image analysis method uses both object-oriented and pixel-oriented analysis to recognize patterns in a target image of stained tissue of a target patient by generating pixelwise descriptors using images of similar stained tissue from other patients. Alternatively, portions of the images of similar tissue as well as portions of the target image are used to generate the pixelwise descriptors. First, the digital images of stained tissue of the other cancer patients are divided into tiles. The digital images depict the same type of tissue stained with the same biomarker as used with the target patient. For example, all of the images may show prostate tissue immunohistochemically stained for the CD8 antibody. The tiles are separated into clusters whose tiles exhibit pixel characteristics that are similar.

A matching cluster of tiles is identified whose pixel characteristics most closely match the pixel characteristics of the target digital image of stained tissue of the target patient. The tiles of the matching cluster are segmented into objects using computationally intensive object-oriented segmentation. Object characteristics of the segmented objects are determined. A color is assigned to each of the object characteristics. Pixelwise descriptors are generated that describe which of the object characteristics each characterized pixel most probably exhibits based on a quality of a second pixel at a predetermined offset from the characterized pixel. A pixel heat map is generated by applying the pixelwise descriptors to each pixel of the target digital image without segmenting the target digital image into objects such that each pixel of the target digital image has the color assigned to the object characteristic most probably exhibited by that pixel. The pixel heat map is then displayed on a graphical user interface.

In another embodiment, the pixelwise descriptors are trained on both the tiles of the matching cluster as well as on tiles from the target digital image. In this manner, both assay-based learning from the similar tiles and case-based learning from the tiles of the target patient are used to train the pixelwise descriptors. This combined learning results in greater accuracy and robustness of the system by ensuring that the pixelwise descriptors can recognize both the tissue types present in the learning tiles of the target patient as well as tissue types that are similar to those of the target patient but that might not have been included in the learning tiles of the target patient.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

Figures show a flowchart of steps of another method for recognizing patterns in digital images of stained tissue slices using both object-oriented and pixel-oriented analysis.

Figure 19A:
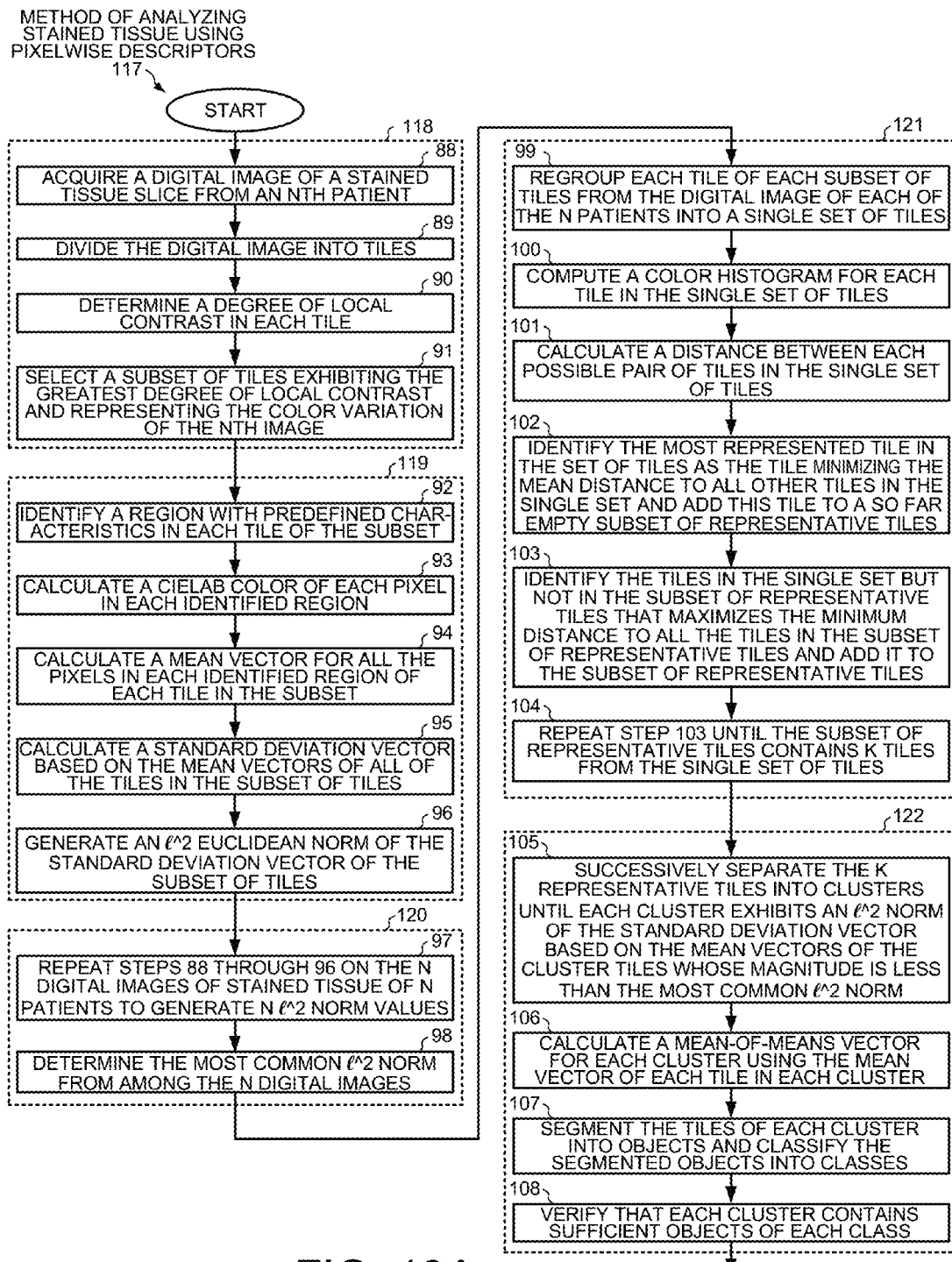
Figure 19B:
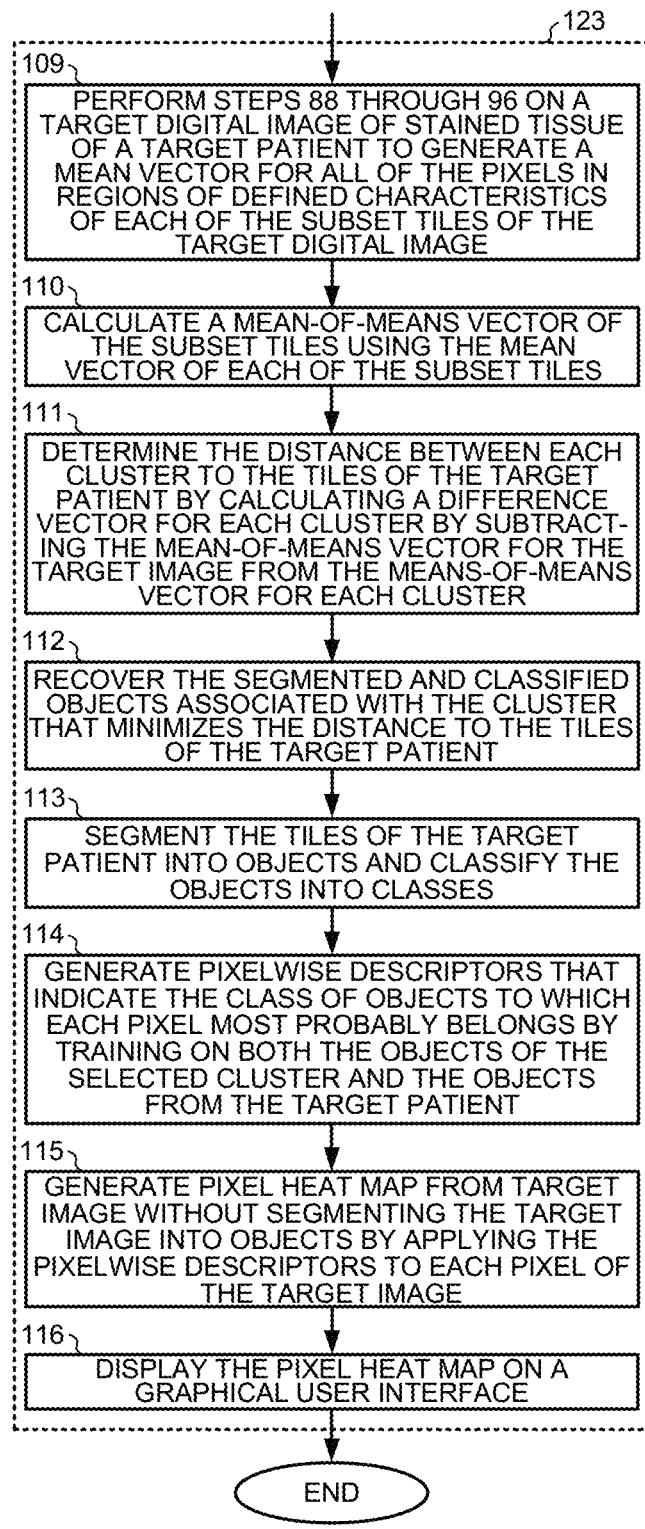

FIG. 19A shows steps 88-108 of the image analysis method, and FIG. 19B shows steps 109-116.

Figure 20:
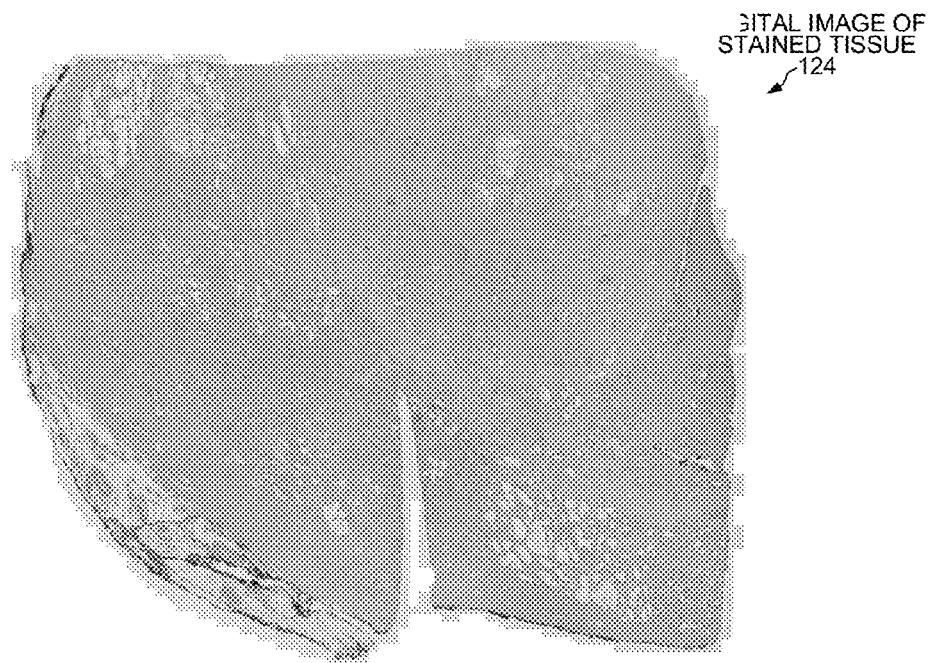

FIG. 20 shows a digital image of prostate tissue stained with tumor protein p63 from a first of N patients.

Figure 21:
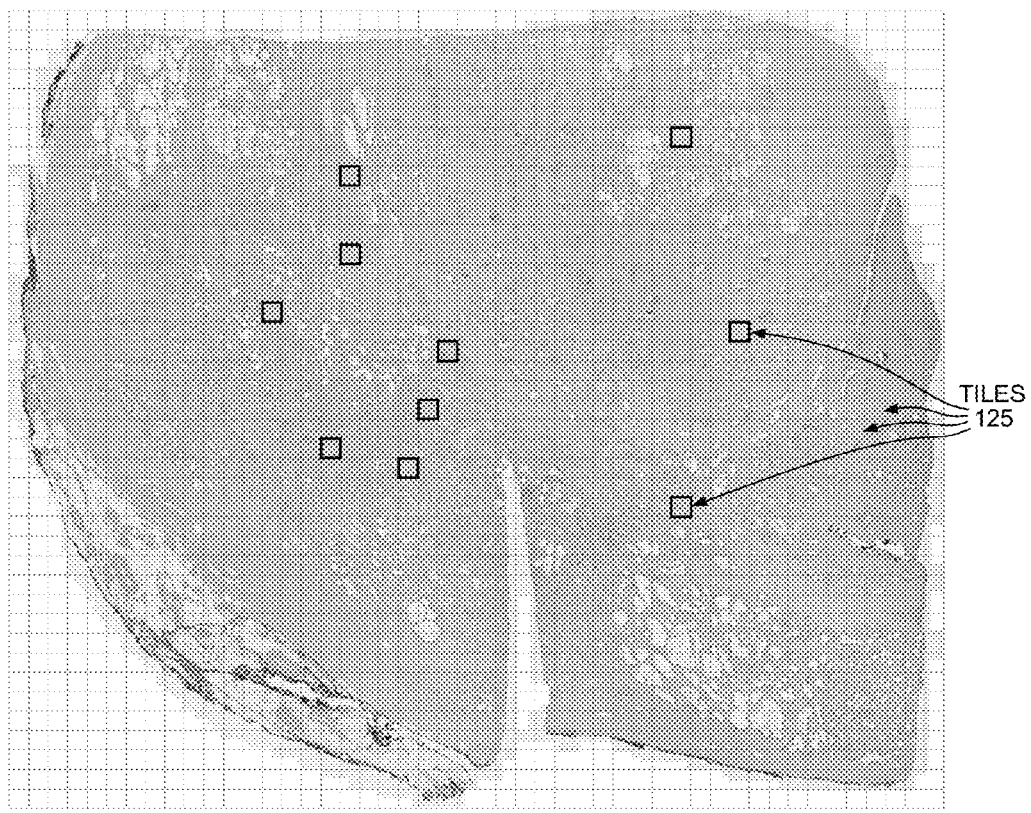

FIG. 21 shows how the image of FIG. 20 is displayed in tiled sections on a graphical user interface.

Figure 22:
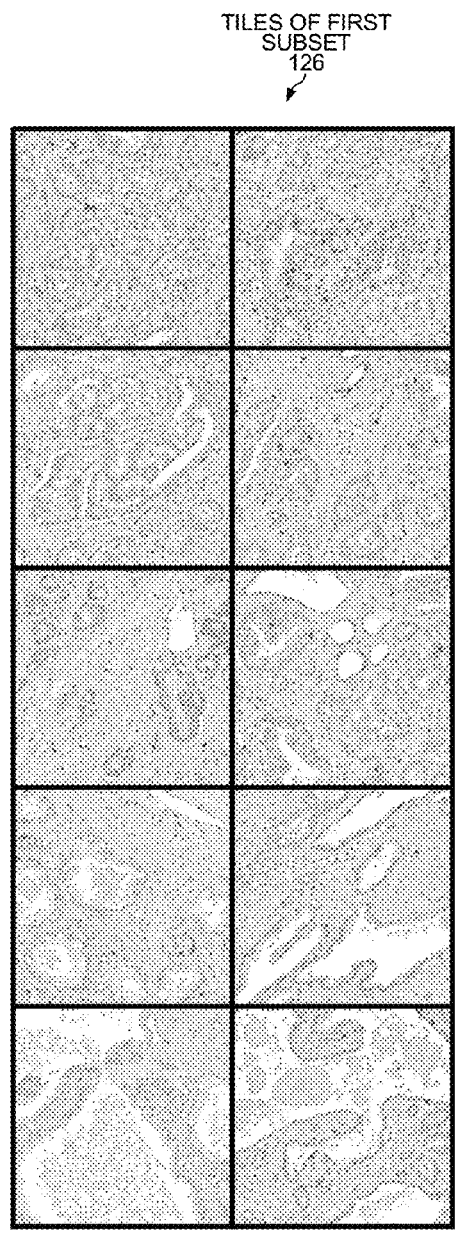

FIG. 22 shows ten tiles from the sectioned image of FIG. 21 assembled in a 2-by-5 array.

Figure 23:
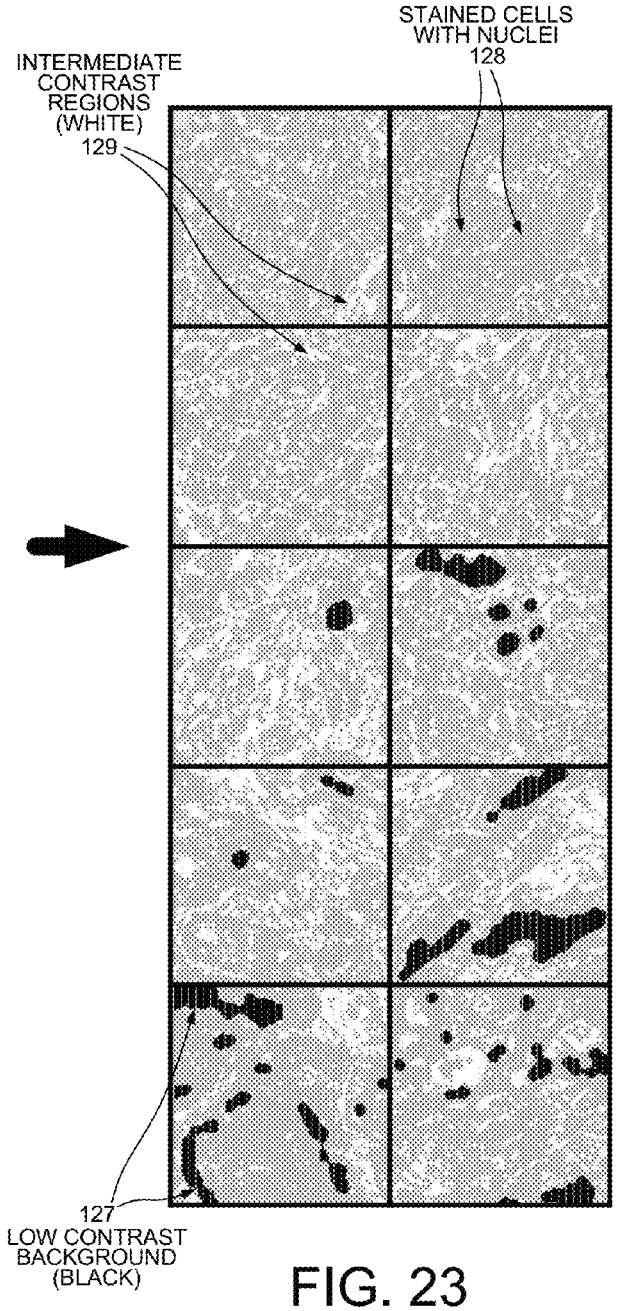

FIG. 23 shows low, intermediate and high contrast regions identified in the ten tiles of FIG. 22.

Figure 24:
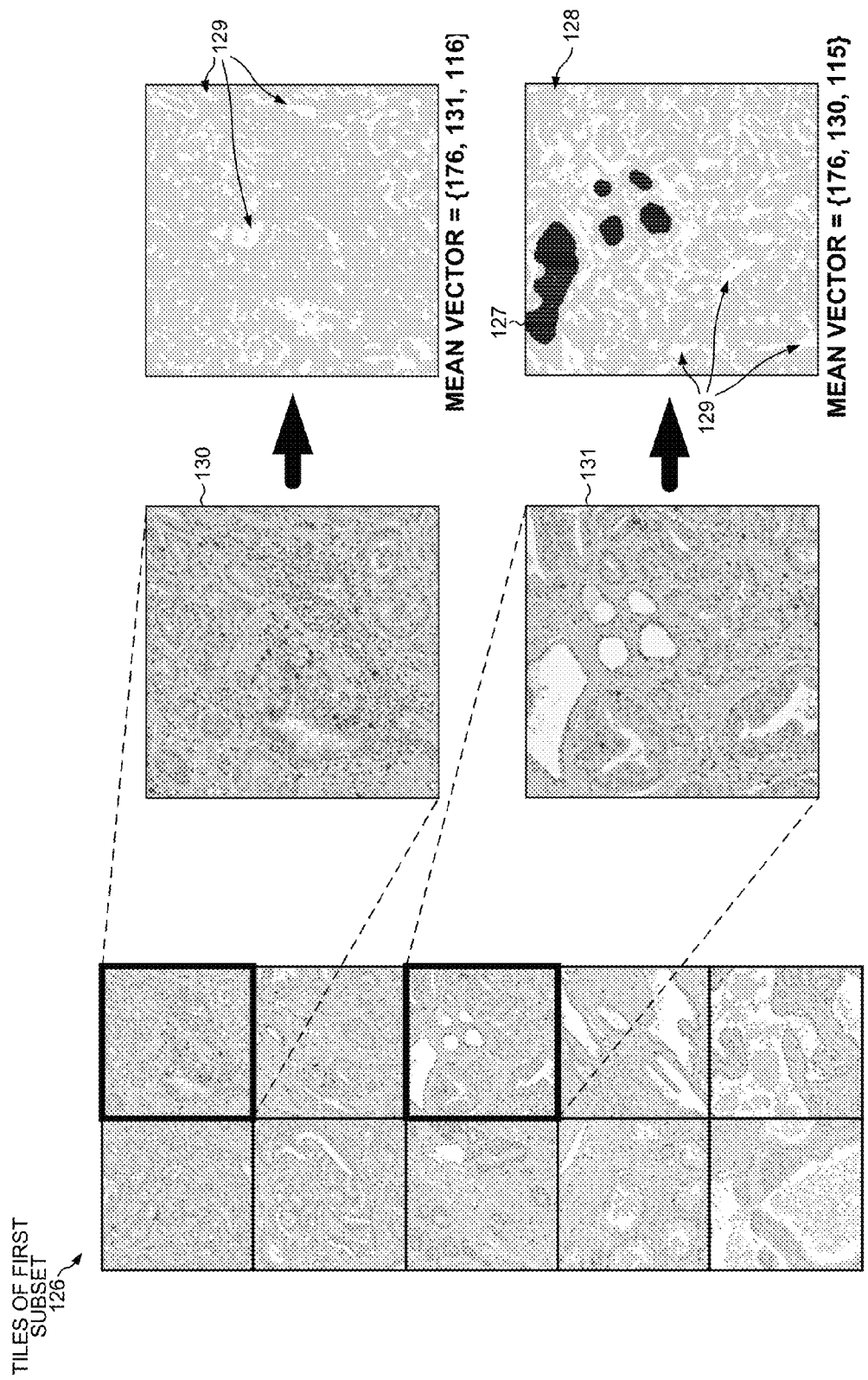

FIG. 24 illustrates the calculation of the mean vectors for two tiles of the ten tiles of FIG. 22.

FIG. 25 illustrates the calculation of the standard deviation vector for the ten tiles of FIG. 22.

Figure 26:
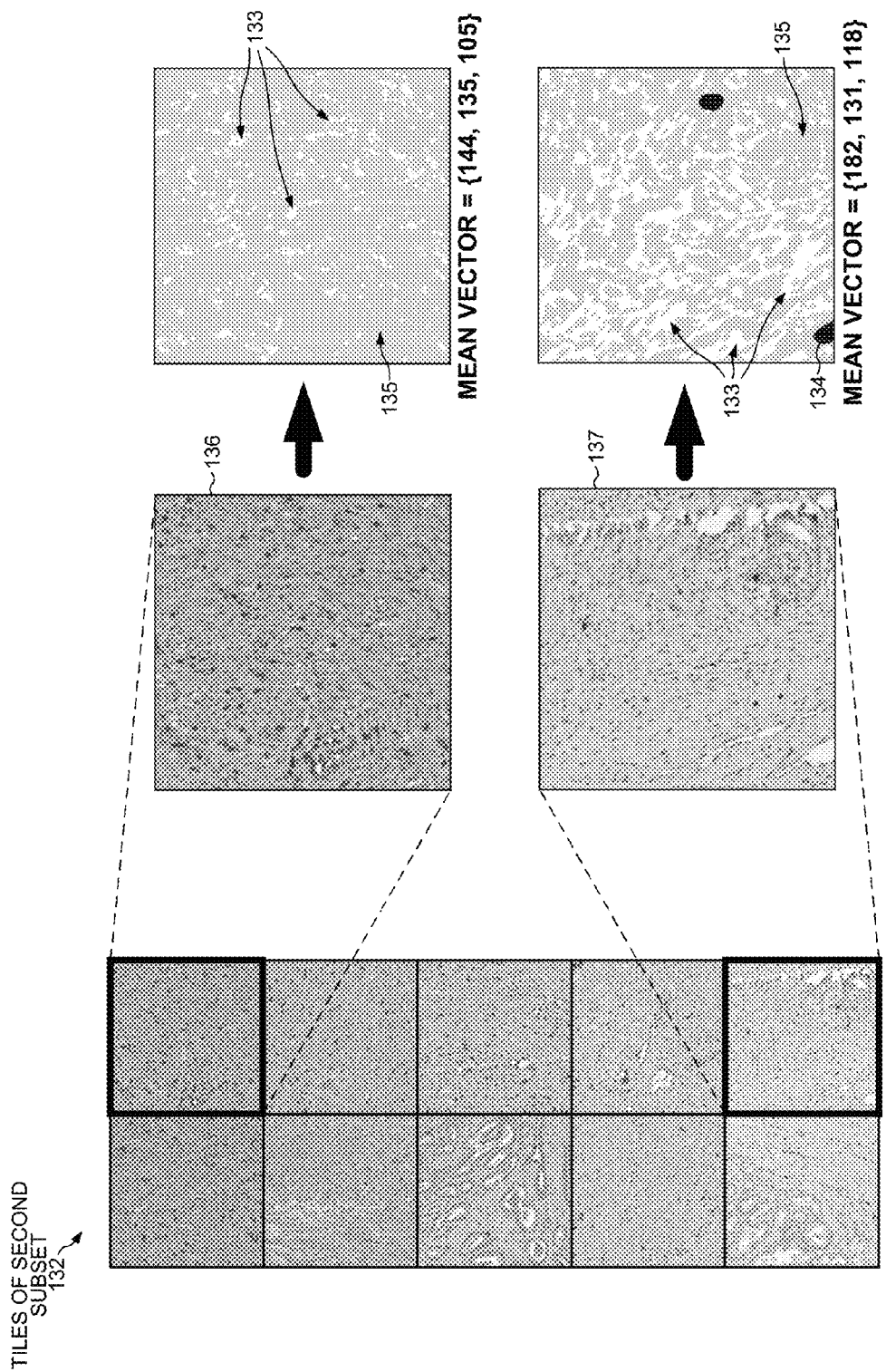

FIG. 26 illustrates the calculation of the mean vectors for two tiles of a second subset of tiles from a second digital image.

Figures 27, 28:
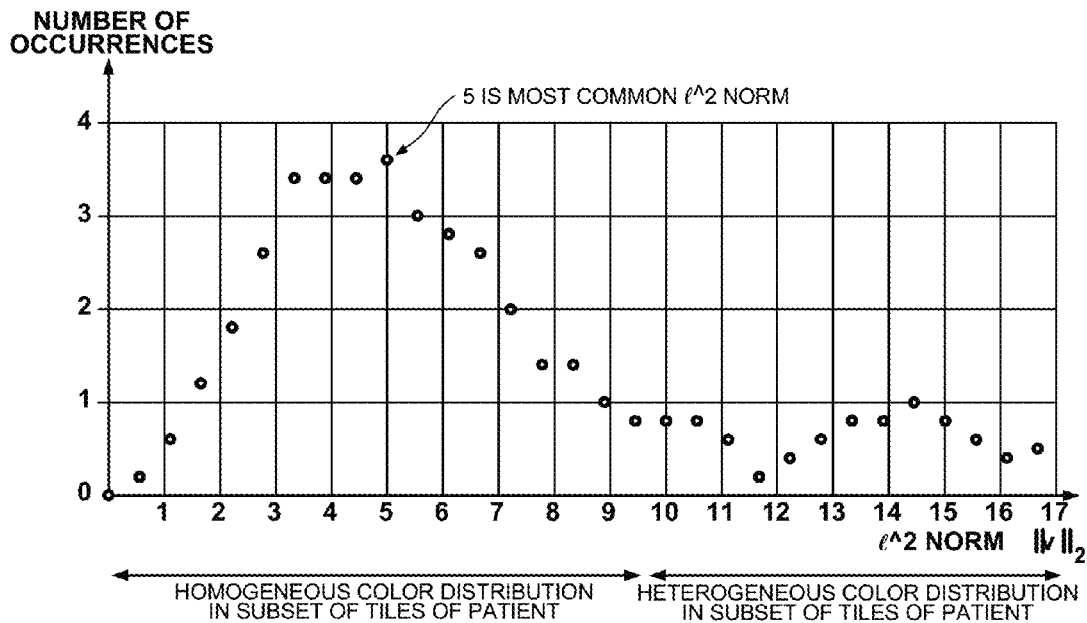

FIG. 27 illustrates the calculation of the standard deviation vector for the ten tiles of FIG. 26.

FIG. 28 shows a histogram with filtered entries of the number of occurrences of each $l^2$ norm magnitude range for forty-four cancer patients.

Figure 29:
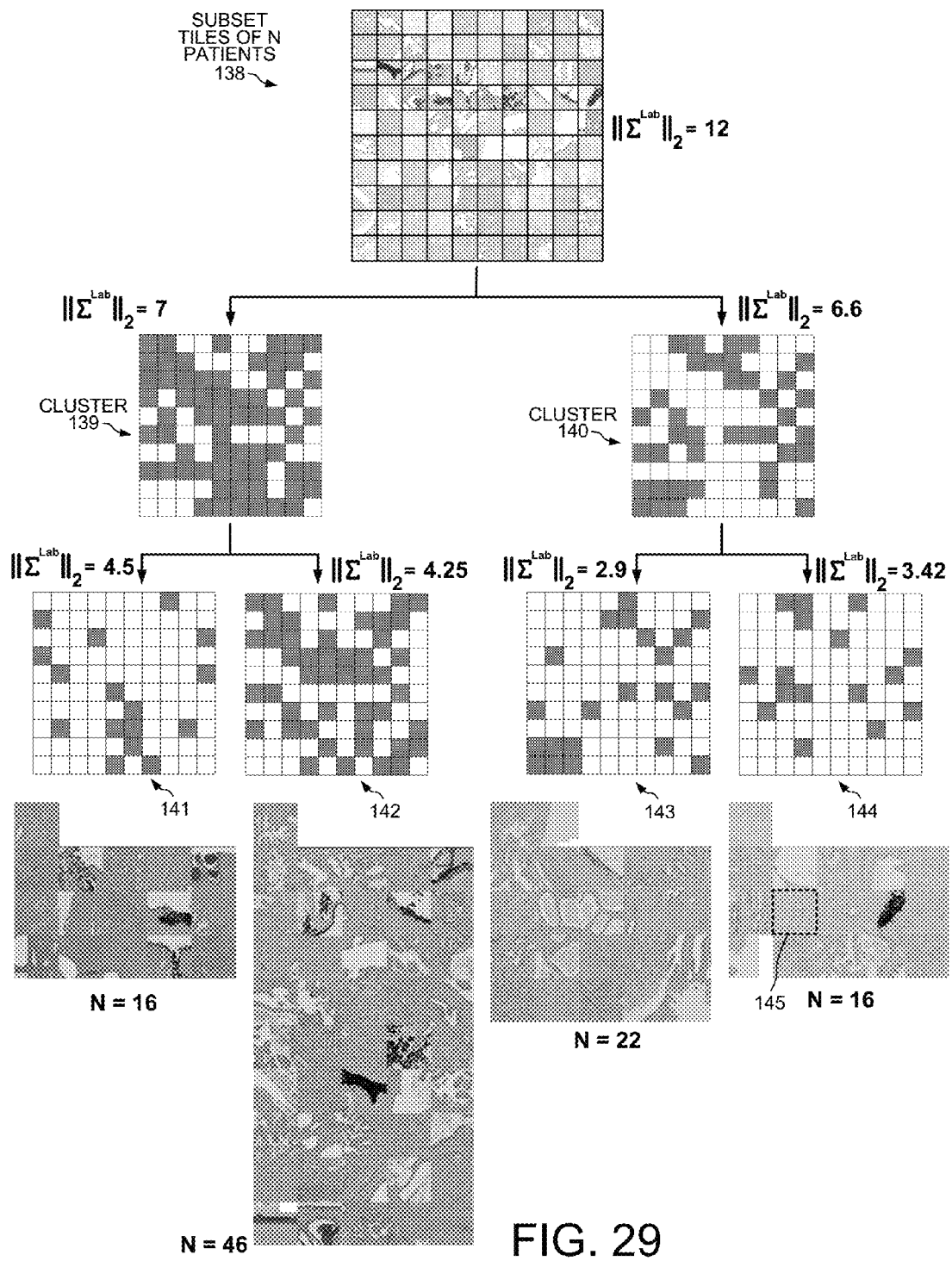

FIG. 29 illustrates the successive separation of subset tiles into clusters until each cluster exhibits an $l^2$ norm whose magnitude is less than the most common $l^2$ norm.

Figure 30:
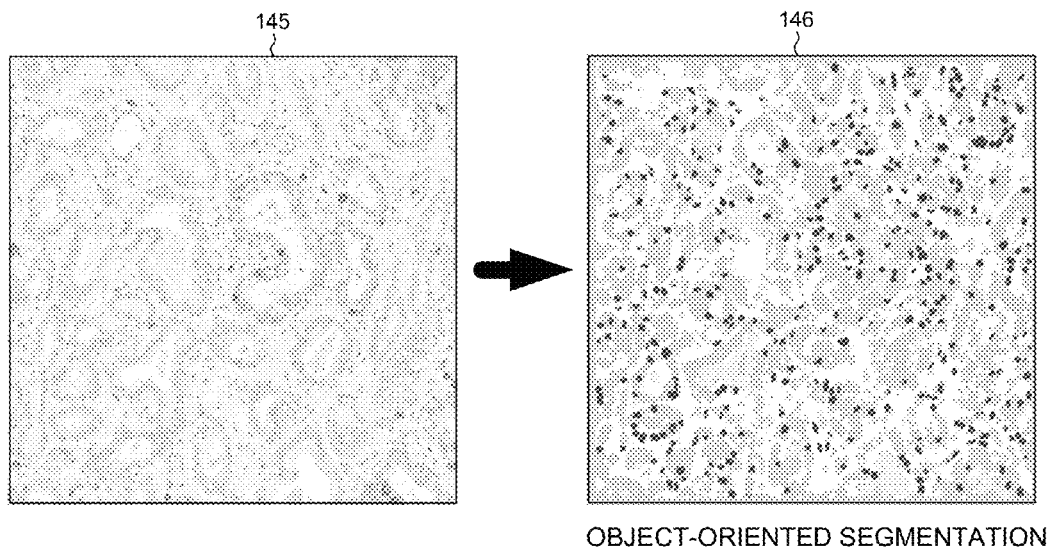

FIG. 30 illustrates object-oriented segmentation performed on a tile of one of the tile clusters of FIG. 29.

Figure 31:
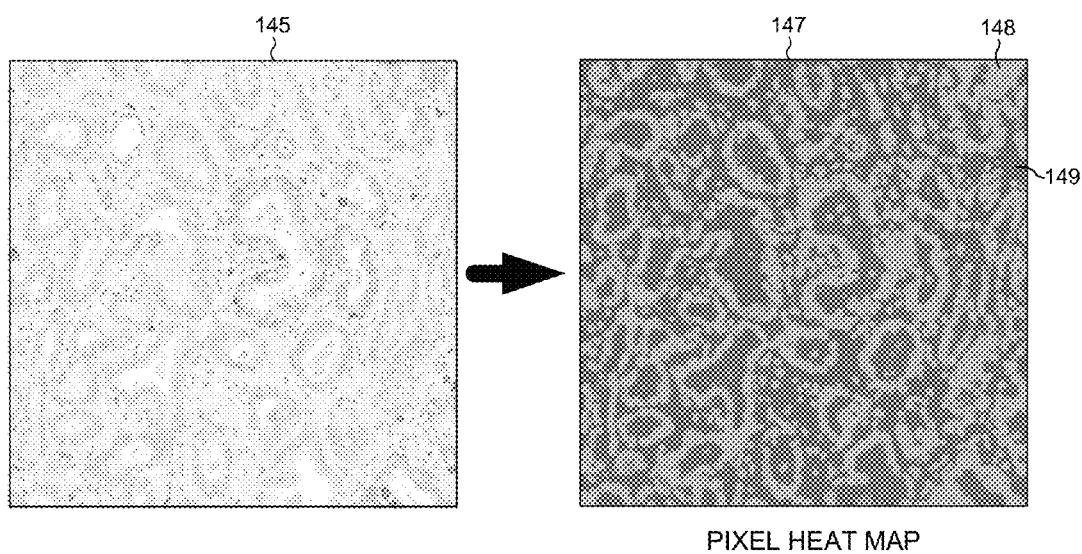

FIG. 31 shows a pixel heat map generated from a tile of a tile clusters of FIG. 29.

Figure 32:
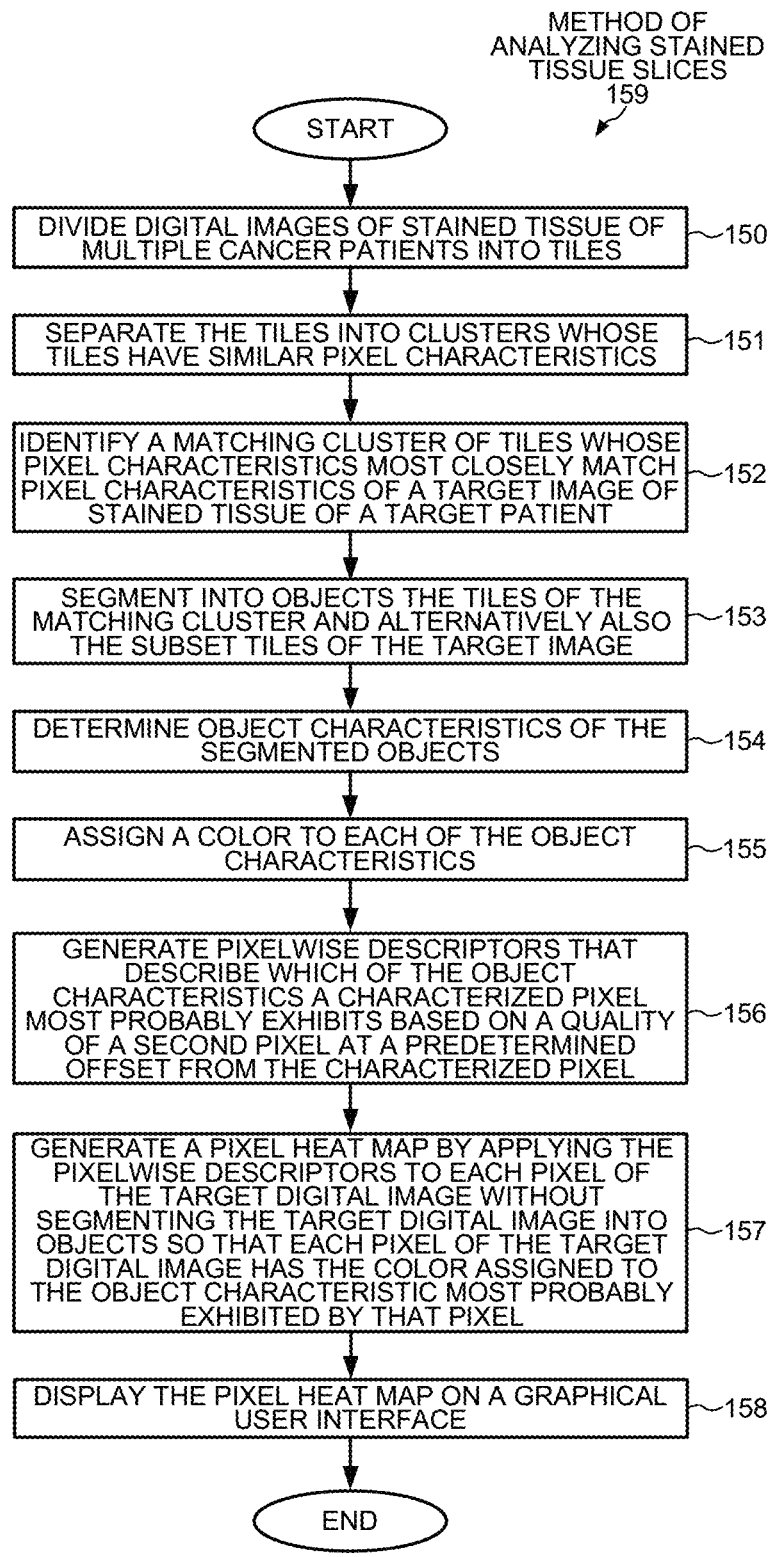

FIG. 32 is a flowchart of steps of a method for recognizing patterns in digital images of stained tissue using both object-oriented segmentation and pixel-oriented image analysis.

DETAILED DESCRIPTION

Reference will now be made in detail to some embodiments of the invention, examples of which are illustrated in the accompanying drawings.

Figure 1:
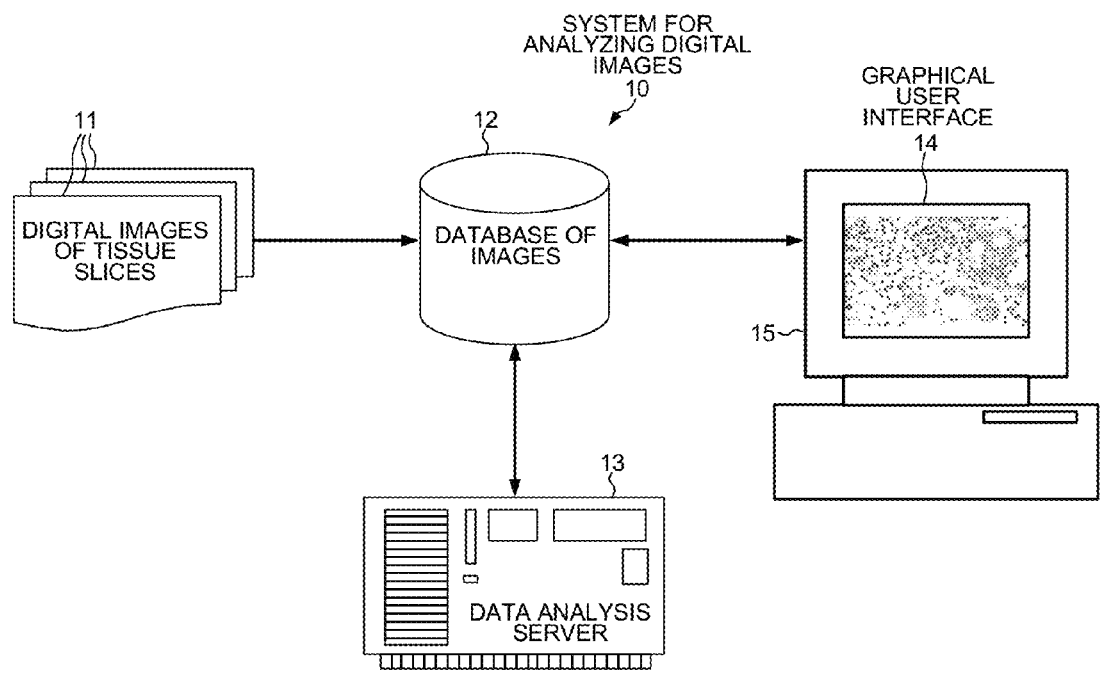
FIG. 1 is a diagram of a system for analyzing digital images using both statistical pixel-oriented analysis and object-oriented analysis that links pixels to data objects forming hierarchical networks.

FIG. 1 shows a system 10 for analyzing digital images using both statistical pixel-oriented analysis and object-oriented analysis that links pixels to data objects forming hierarchical networks. System 10 is used to analyze images of tissue slices stained with various biomarkers, such as tissue stained with hematoxylin and eosin (H&E) or tissue stained with a protein-specific antibody using immunohistochemistry (IHC). Digital images 11 of the stained tissue slices are acquired at high magnification. A typical digital image of a tissue slice has a resolution of 100,000×200,000 pixels, or 20 billion pixels. The acquired digital images 11 are stored in a database 12 of digital images. Image analysis software executing on a data analysis server 13 then performs intelligent image processing and automated classification and quantification. The image analysis software is a computer program product tangibly embodied on a computer-readable storage medium in server 13 and comprises computer readable and executable program instructions that when executed by a processor on server 13 provide a visual display on a graphical user interface 14 of an interconnected display device 15, such as a personal computer. The image analysis software transforms unlinked input data in the form of pixels into a hierarchical semantic network of objects.

System 10 analyzes, grades, scores and displays the digital images 11 of tissue slices that have been stained with various biomarkers. The image analysis program segments and classifies objects in the digital images 11. The program prepares links between some objects and thereby generates higher hierarchically ranked objects. The image analysis program provides the higher hierarchically ranked objects with properties, classifies them, and then links those objects again at a still higher level to other objects. The higher hierarchically ranked objects are used to find target patterns in the images. More easily detected starting data objects are first found and then used to identify harder-to-find data objects in the hierarchical data structure.

Figure 2:
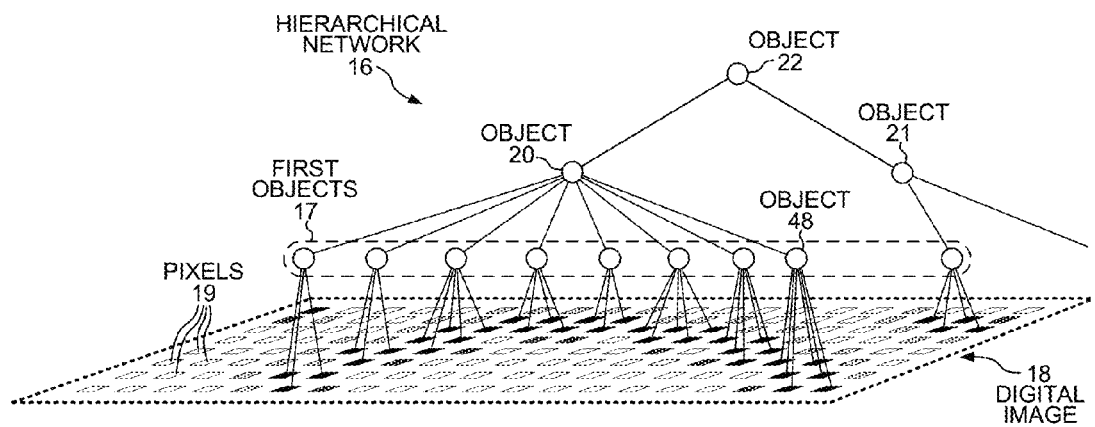
FIG. 2 illustrates a data network generated by the system of FIG. 1 in which data objects of a hierarchical network are linked to selected pixels of an image of a stained tissue.

FIG. 2 illustrates an exemplary hierarchical network 16 that is generated by image analysis system 10. System 10 generates first objects 17 from a digital image 18 based on the stained tissue. The image analysis program of system 10 uses object-oriented image analysis to generate data objects of hierarchical semantic network 16 by linking selected pixels 19 to data objects according to a classification network and according to a process hierarchy of steps and algorithms. For a more detailed description of generating a data network using a process hierarchy and a class network, see U.S. Pat. No. 8,319,793, the contents of which are incorporated herein by reference. Each digital image comprises pixel values associated with the locations of each of the pixels 19. The image analysis program operates on the digital pixel values and links the pixels to form objects. Each object is linked to a set of pixel locations based on the associated pixel values. For example, an object is generated by linking to the object those pixels having similar characteristics, such as hue, saturation and brightness as defined by the pixel values. Alternatively, the pixel values can be expressed in a 3-value color space. For example, in the RGB color space, three 3-digit numbers in the range from zero to 255 define the color. The three numbers represent the amounts of red, green and blue in the represented color. For example, red is represented as 255-0-0, dark green is represented as 0-100-0, royal blue is designated as 65-105-225, white is represented as 255-255-255, and black is represented as 0-0-0. Smaller numbers represent darker colors, so 100-100-100 is a darker gray than 200-200-200, and 0-0-128 is a darker blue (navy) than straight blue 0-0-255. Although the operation of system 10 is described in relation to the RGB color space, other color spaces and representations may also be used, such as the CMYK (cyan, magenta, yellow, black) color model, the CIE 1931 RGB color space, the CIE 1964 XYZ color space, the 1976 CIELAB color space or the HSV and HSL representation of the RGB color space. Thresholds of brightness at pixel locations that are grouped together can be obtained from a histogram of the pixel values in the digital image. The pixels form the lowest hierarchical level of hierarchical network 16.

In one example, pixels having the color and intensity imparted by the biomarker stain are identified and linked to first objects 17. The first objects 17 form the second hierarchical level of hierarchical network 16. Then data objects are linked together into classes according to membership functions of the classes defined in the class network. For example, objects representing nuclei are linked together to form objects 20-21 in a third hierarchical level of hierarchical network 16. In FIG. 2, some of the first objects 17 correspond to stained pixels of the nuclear membrane of a nucleus corresponding to object 20. In addition, another of the first objects 17 corresponds to stained pixels on the nuclear membrane of a separate nucleus represented by object 21. An additional object 22 is generated in a fourth hierarchical level of hierarchical network 16 and is linked to all of the objects that represent stained nuclei. Thus, the objects 20-21 corresponding to stained nuclei are linked to object 22.

The knowledge and the program flow of the image analysis program are separated in the software structure. The parameters by which the image analysis is performed, for example thresholds of size or brightness, can be changed without having to revise the process hierarchy of software steps. The image analysis software displays both the original digital images 11 as well as the corresponding processed images and heat maps on the graphical user interface 14. Pixels corresponding to classified and segmented objects in the digital images are colored, marked or highlighted to correspond to their classification. For example, the pixels of objects that are members of the same class are depicted in the same color.

Figure 3:
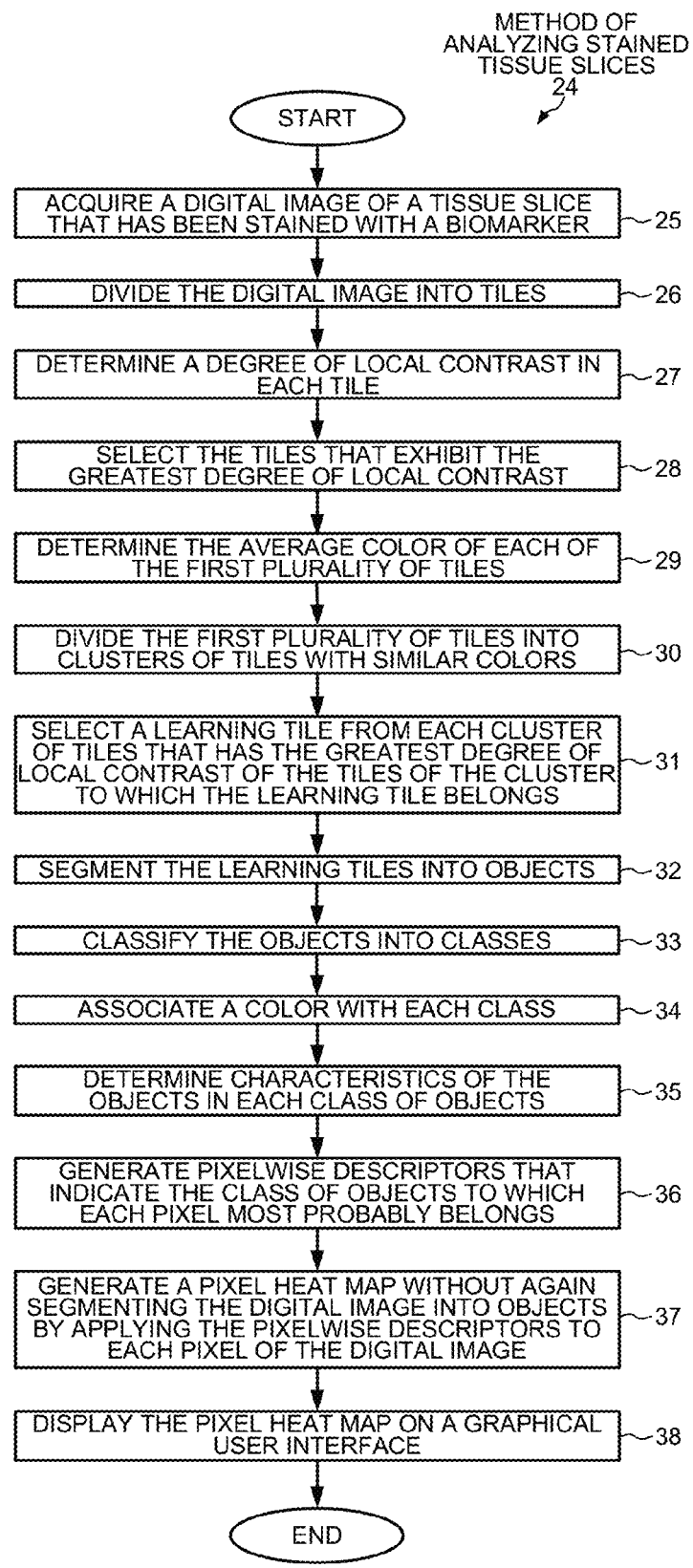
FIG. 3 is a flowchart of steps by which the system of FIG. 1 recognizes patterns in digital images of stained tissue slices using both object-oriented analysis and pixel-oriented analysis.
Figure 4:
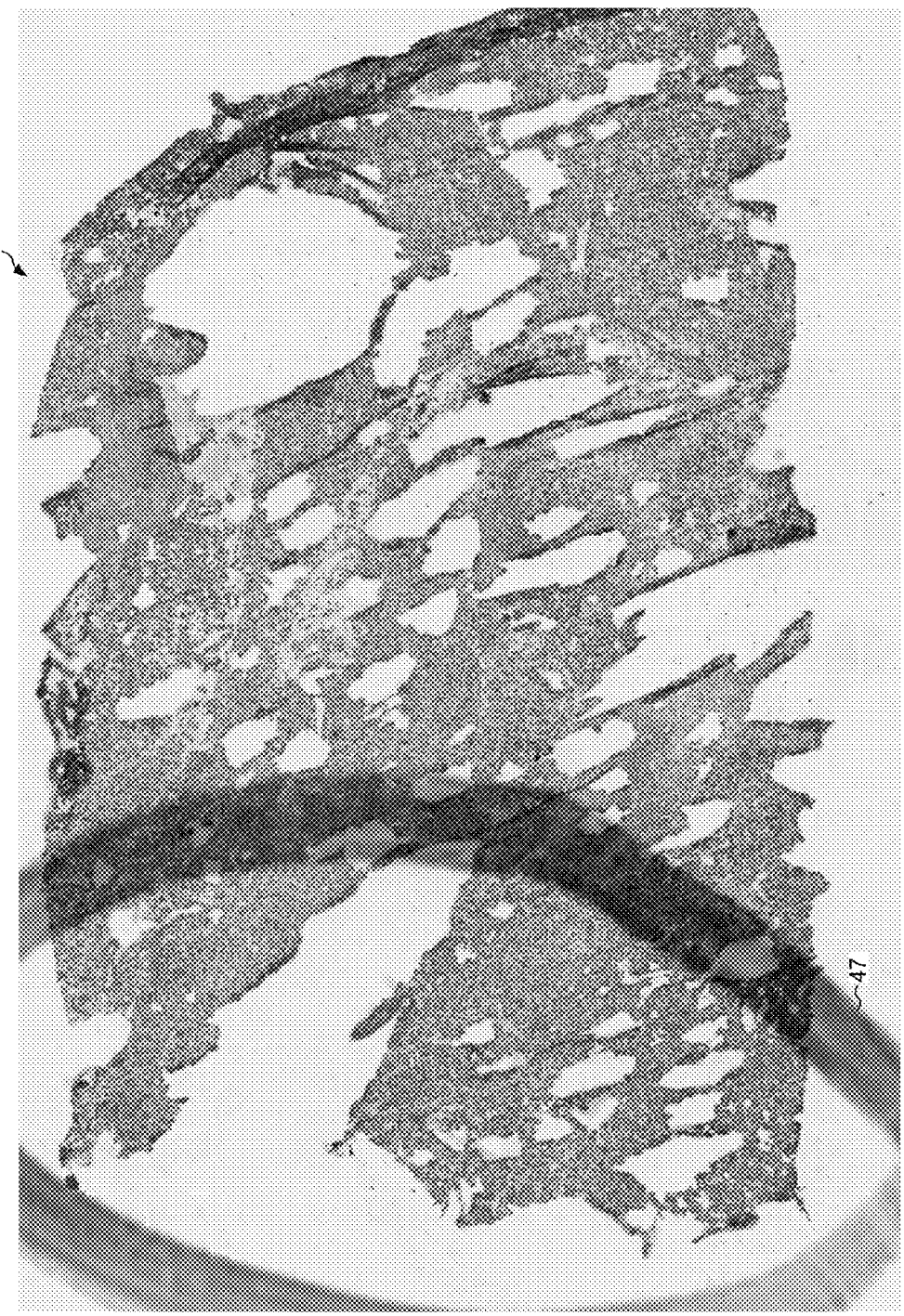
FIG. 4 shows a high-resolution digital image of kidney tissue that has been stained with hematoxylin and eosin (H&E).

FIG. 3 is a flowchart of steps 25-38 of a method 24 by which analysis system 10 recognizes patterns in digital images of stained tissue slices using both object-oriented analysis and pixel-oriented analysis. In a first step 25, a high-resolution digital image is acquired of a tissue slice that has been stained with a biomarker. FIG. 4 shows an exemplary digital image 46 of kidney tissue that has been stained with hematoxylin and eosin (H&E). A slice of the kidney tissue has been placed on a slide before the digital image was scanned. The image includes an artifact 47 of a pen mark in which an area of the tissue has been circled.

Figure 5:
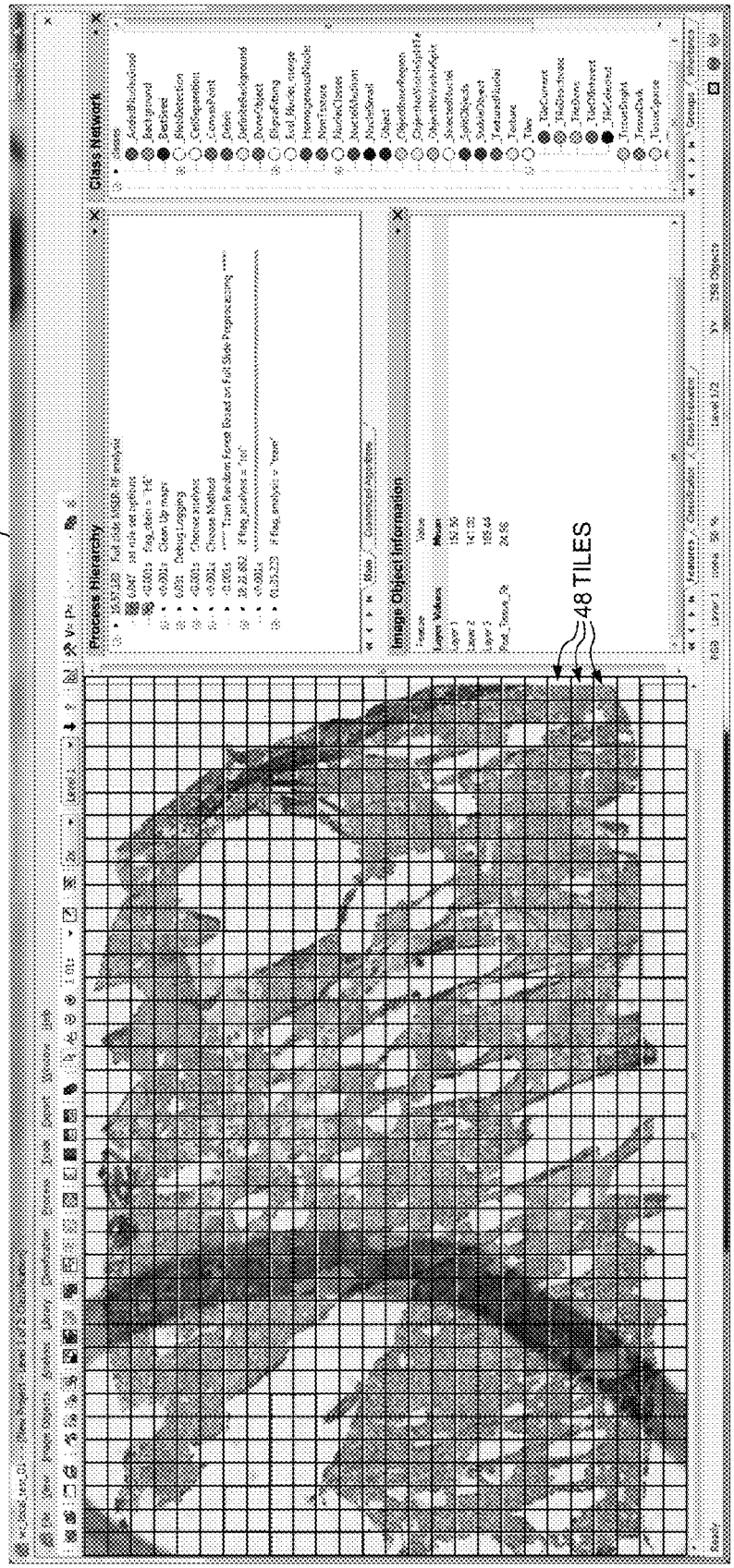
FIG. 5 is a screenshot of the graphical user interface of the system of FIG. 1 in which the image of FIG. 4 is displayed in tiled sections.

In a next step 26, high-resolution digital image 46 is divided into tiles 48. FIG. 5 shows how digital image 46 is displayed in tiled sections 48 on graphical user interface 14 of system 10 after step 26 is performed.

In step 27, system 10 determines the degree of local contrast in each of the tiles 48. First, an intensity threshold is set at the average intensity of the pixels in each tile. The pixels are divided into a first group whose intensities are above the threshold and a second group whose intensities are below the threshold. Regions of contiguous pixels in the first and in the second groups are then identified. Then the intensity threshold is incrementally changed and the regions of contiguous pixels in the two groups are again identified. The regions that remain stable despite the change in the intensity threshold are defined as maximally stable extremal regions (MSER). The ratio of the area covered by stable regions (MSER) in each tile is determined. A higher ratio of stable regions indicates a greater degree of local contrast.

Figure 6:
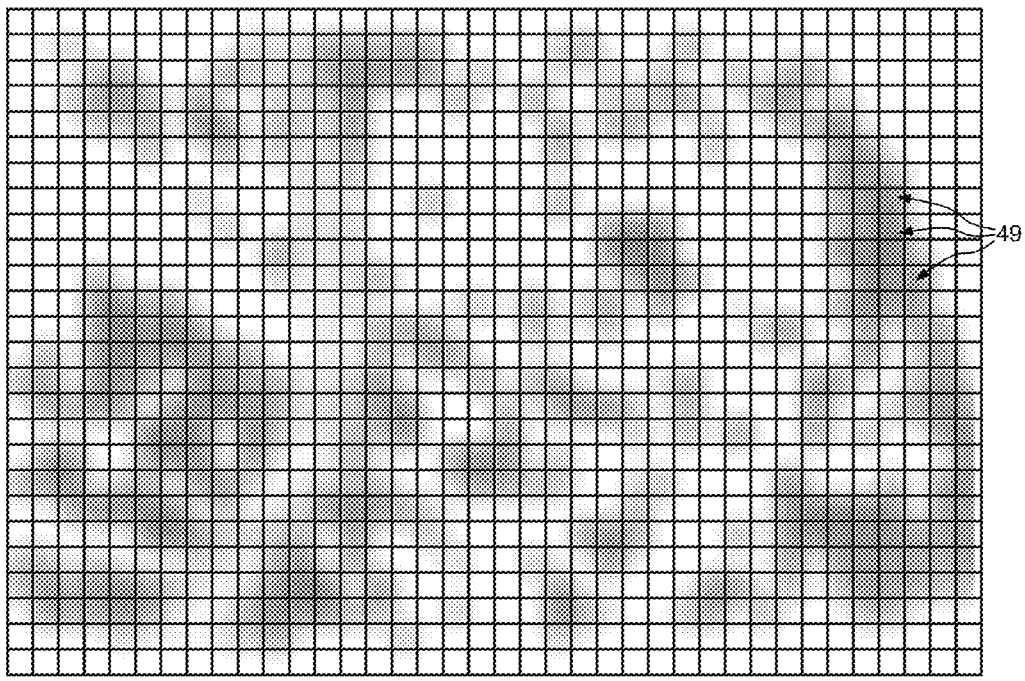
FIG. 6 shows how the system of FIG. 1 displays the tiles of FIG. 5 to represent the degree of local contrast in each tile.

FIG. 6 shows how the tiles 48 are displayed on graphical user interface 14 to represent the degree of local contrast in each tile. The darker areas 49 in FIG. 6 indicate the location of maximally stable extremal regions (MSER) that remain despite an incremental change in the intensity threshold. The darker areas 49 indicating a greater degree of local contrast tend to contain more relevant and a wider variety of tissue types.

Figure 7:
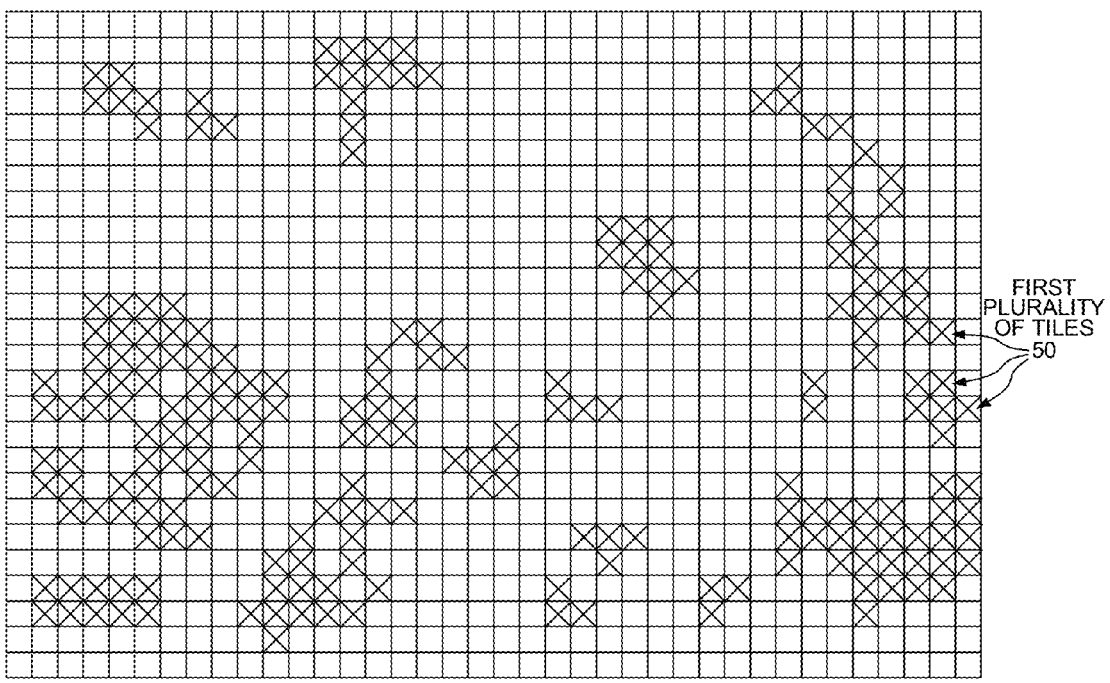
FIG. 7 shows 212 of the tiles of FIG. 5 marked with an "X" to indicate the tiles with the greatest degree of local contrast.

In step 28, a first plurality 50 of the tiles 48 are selected that exhibit the greatest degree of local contrast. The tiles covered by the greatest ratio of darker areas 39 and that contain the darkest darker areas are selected as the first plurality of tiles 50. Of the 988 total tiles shown in FIG. 7, 212 of the tiles are marked with an "X" to indicate the first plurality of tiles. The remaining unmarked tiles contain less interesting tissue that is less likely to include representative amounts of all tissue types. By selecting only those tiles with the greatest contrast and the greatest portion of high-contrast area, the background tiles containing no tissue are also removed.

In step 29, the average color of each of the first plurality of tiles 50 is determined. Each of the tiles 50 is a matrix of pixel locations associated with numerical pixel values. In this embodiment, the pixel values represent the color of each pixel in the RGB color space and include three 3-digit numbers in the range from zero to 255. The three numbers represent the amounts of red, green and blue in the color of the pixel. For all of the pixels in each tile, the average red number, green number and blue number are calculated. The three average numbers represent a point in RGB space. A point in RGB space is determined for each of the 212 tiles in the first plurality of tiles 50. The 212 points in RGB space form a cloud. In an alternative embodiment, the colors of the tiles can be determined using lower resolution versions of the first plurality of tiles 50. Multiple pixels of each of the tiles 50 are represented by a single pixel of each lower resolution tile.

Figure 8:
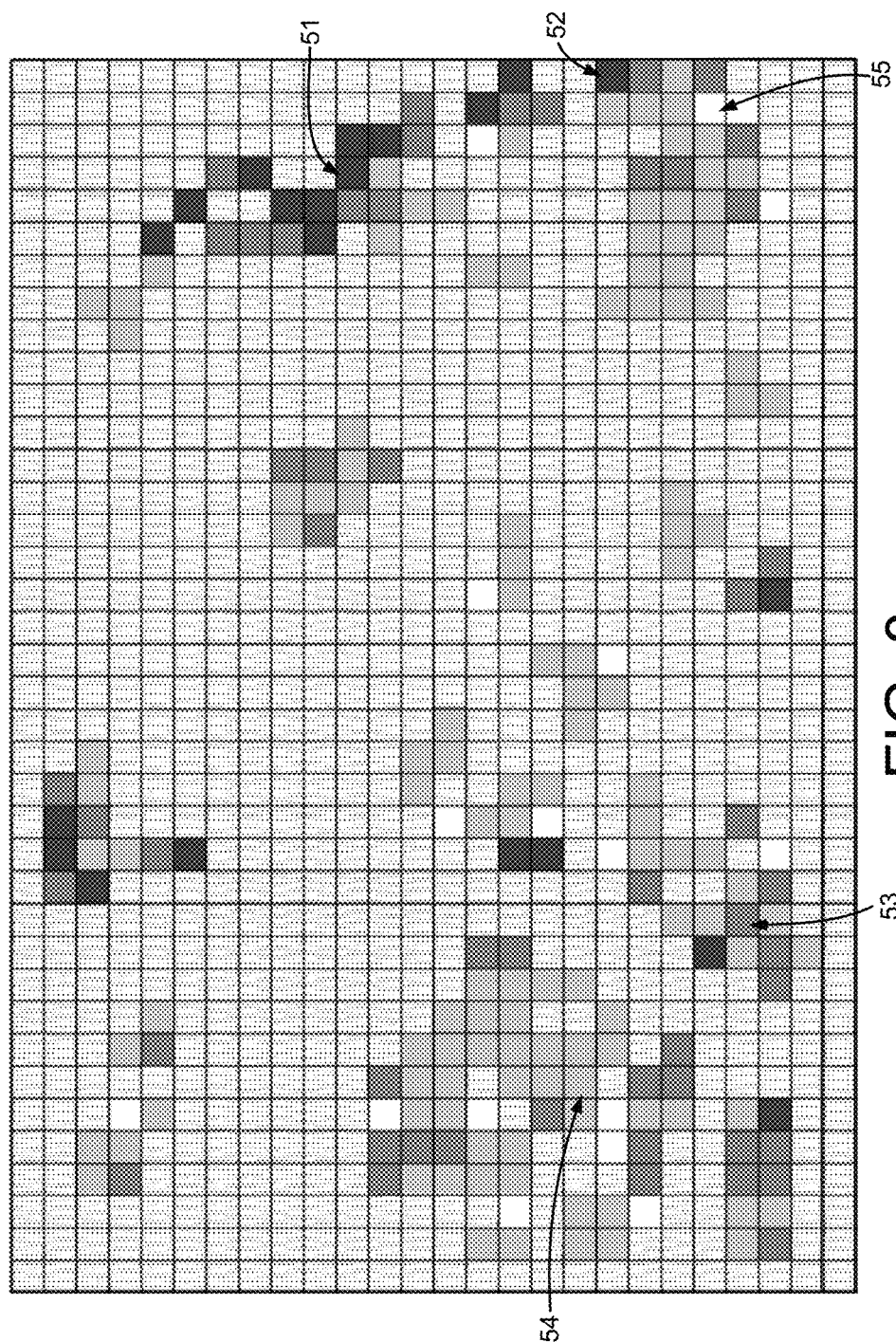
FIG. 8 shows each of the 212 tiles of FIG. 5 displayed in a shade of gray corresponding to one of five color clusters.

In step 30, the first plurality of tiles 50 (or the lower resolution versions of these tiles) is divided into clusters of tiles with similar colors. The cloud of points in RGB space is divided into five areas of concentration of the points. The points in each of the five areas correspond to color clusters of the tiles 50. FIG. 8 shows a matrix of tile locations in which each of the first plurality of tiles 50 is displayed in a shade of gray corresponding to one of the five color clusters. For example, sixteen of the 212 first plurality of tiles 50 are in the color cluster represented by white.

Figure 9:
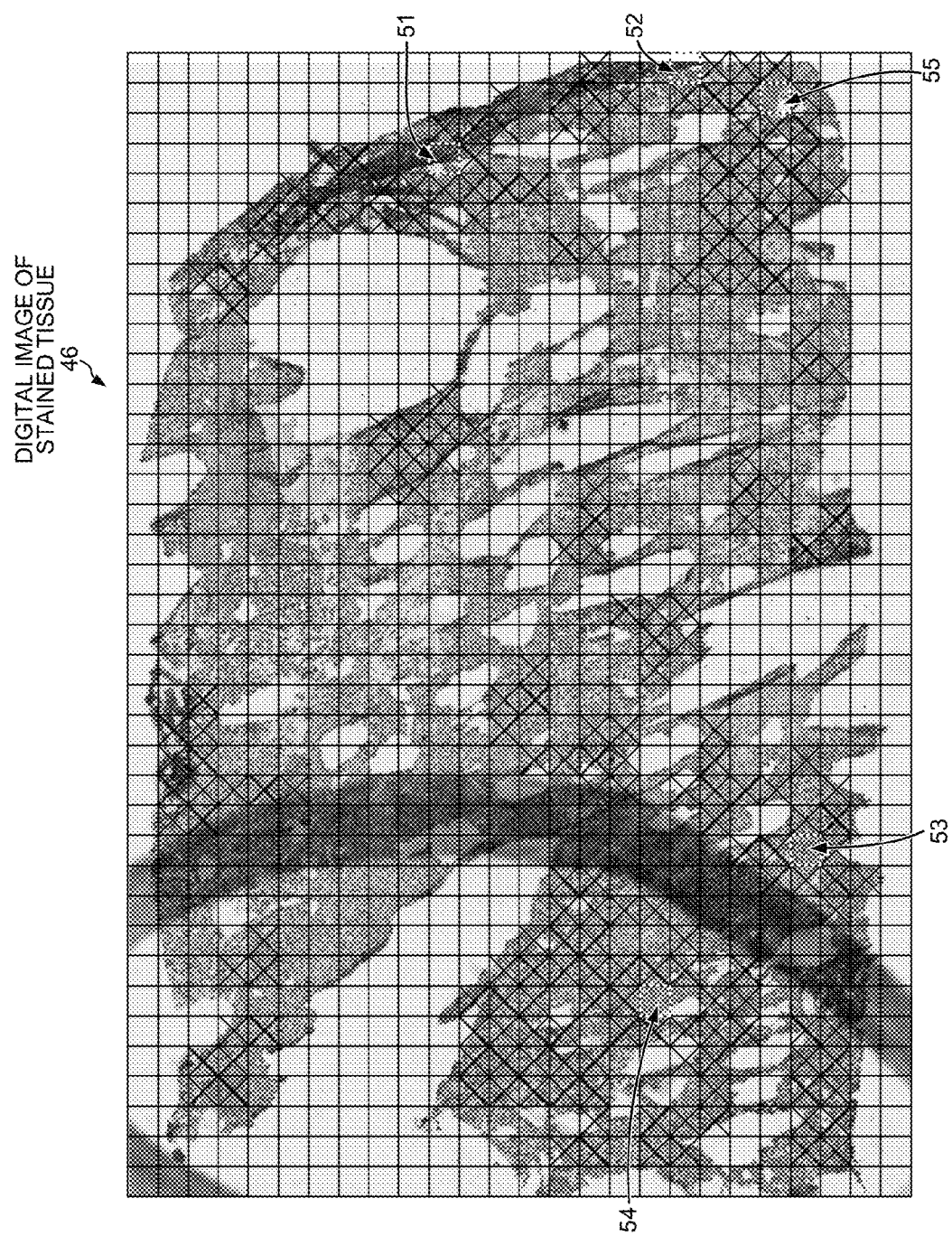
FIG. 9 shows the locations on the image of FIG. 4 of five learning tiles as well as the locations of the remainder of the tiles with the greatest degree of local contrast marked with Xs.

In step 31, a learning tile is selected from each cluster of tiles. From each color cluster of tiles, the tile is selected that has the highest proportion of stable regions. Thus, each learning tile exhibits the greatest degree of local contrast from among the tiles of the cluster to which the learning tile belongs. In FIG. 8, the five learning tiles from each of the five color clusters are labeled 51-55. For example, tile 55 is the tile that exhibits the greatest degree of local contrast from among the tiles in the color cluster represented by white. FIG. 9 shows the locations on digital image 46 of learning tiles 51-55 as well as the locations of the remainder of the first plurality of tiles 50, which are marked with Xs.

In step 32, the learning tiles 51-55 are segmented into data objects using object-oriented image analysis. In step 33, the data objects are classified into classes of objects. And in step 34, a color is associated with each class of objects. Typically, a class network is first defined, and colors are associated with the defined classes. Then the pixels are linked to subobjects, and the subobjects are combined into objects that correspond with the classes in the class network.

The image analysis program analyzes and measures patterns present in the pixels using a computer-implemented network structure. The network structure includes a hierarchical data network, a class network and a process hierarchy. The data objects of the hierarchical data network are generated by linking selected pixels of the learning tiles 51-55 to the data objects according to the classification network using the steps and algorithms of the process hierarchy. In object-oriented processing, a data object is formed based on whether a condition would be satisfied if a particular pixel were to be linked to the object. For example, whether a pixel is linked to a data object can depend on the shape or size of the object that would result if the pixel were included in the object. Whether a pixel is linked to an object can also depend on the average brightness of all of the pixels associated with the object that would result if the particular pixel were to be included in the object. The objects are combined in the hierarchical data network to form higher level objects, which are classified into classes of the class network.

Object-oriented image analysis can produce better segmentation than pixel-oriented analysis because subobjects can be combined in alternative ways, and the best result can then be chosen. Multiple segmentation strategies can be simultaneously pursued by concurrently computing alternative object classifications (segmentation of objects into classes) using several cores of a multi-core computer. Combining subobjects in alternative ways to produce the best overall segmentation is not possible with solely pixel-oriented processing in which no hierarchical data network is generated.

Figure 10:
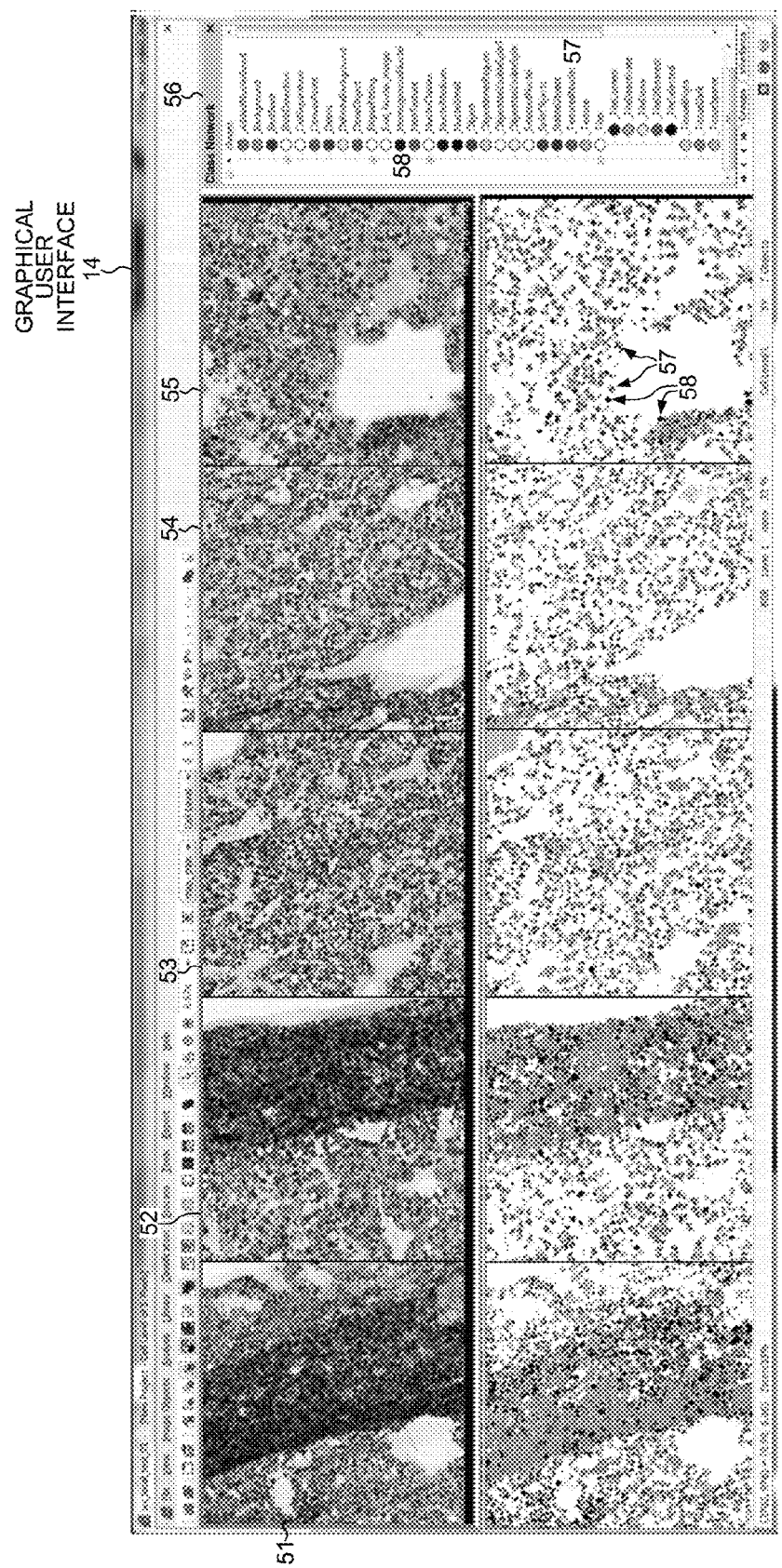
FIG. 10 is a screenshot of the graphical user interface of the system of FIG. 1 in which the five learning tiles identified in FIG. 9 are displayed side-by-side in the top row.

FIG. 10 is a screenshot of graphical user interface 14 on which the five learning tiles 51-55 are displayed side-by-side in the top row. Object-oriented image analysis has been performed on the learning tiles 51-55, and data objects have been segmented and classified into the classes in the class network 56 at the right side of graphical user interface 14. The results of the segmentation are shown in the row of images below the row of learning tiles. Through the computationally intensive algorithms of the process hierarchy, pixels are linked to subobjects, which are combined to form data objects that are classified into morphologically accurate categories. For example, the class network 56 defines a subclass of nuclei as being "TexturedNuclei" 57. System 10 has accurately identified particular data objects as belonging to the class of textured nuclei 57. System 10 has associated a color with each of the classes and subclasses in the class network 56 at the right side of graphical user interface 14. Each of the data objects that belongs to the class of textured nuclei 57 is depicted in the lower row of images with the color of the subclass assigned by the class network. FIG. 10 also shows objects in the lower row of images that are displayed with the color of the subclass "HomogeneousNuclei" 58 assigned by the class network 57. Thus, system 10 has also accurately identified particular data objects as belonging to the class of homogeneous nuclei 58. It is very difficult with the naked eye to distinguish the nuclei in learning tile 55 that contain textured DNA from those whose DNA is more homogeneously disbursed. However, the homogeneous and textured nuclei can easily be distinguished from one another in the segmented image below learning tile 55 because the two subclasses of nuclei are assigned different colors.

In step 35, system 10 determines characteristics of the objects that belong to the various classes of objects. For example, system 10 determines the distinguishing characteristics that identify the data objects classified as textured nuclei. Other characteristics identify those data objects classified as homogeneous nuclei. Examples of characteristics of a class of data objects include: the elliptical fit of the objects, the average number of concavities of the perimeter of the objects, the average size of the objects, the variation in sizes of the objects of the class, the average color of the objects, the average color of subobjects within the objects, the average intensity of the objects, the amount of intensity variation within each of the objects, and the amount of variation of the average intensity of the objects of the class. The elliptical fit of an object, for example, is the deviation from a circular or elliptical shape of the object. A long object would have a poor elliptical fit. An object with multiple branches would also have a poor elliptical fit, but that object would also be characterized by its number of concavities or indentations between the branches. Object-oriented image analysis can be programmed to recognize objects having subobjects with a selected color. For example, objects can be segmented into nuclei whose perimeters have the selected color of a biomarker or stain.

In step 36, system 10 generates pixelwise descriptors that indicate the object class to which each pixel of the learning tiles 51-55 most probably belongs. The pixelwise descriptors indicate the most likely object class associated with each pixel without referencing any data objects. Instead, purely pixel-oriented image analysis is performed using the descriptors. The pixelwise descriptors indicate the probability that a characterized pixel belongs to a class of objects based on a characteristic of a second pixel or group of pixels at a predetermined offset from the characterized pixel. The pixelwise descriptors are used in random forest decision trees to indicate the probability that each pixel of each learning tile belongs to a particular class of objects. The class probability of each pixel is calculated using multiple decision trees of pixelwise descriptors. Then the average of the probabilities is taken as the result. The various decision trees are trained with random different pixels from the learning tiles so that the average probability of belonging to a particular object class in the execution mode is obtained from a random forest of decision trees in which overfitting to particular training pixels is avoided. Each decision tree is trained on a different random set of pixels. The average result from multiple random forest decision trees provides a more accurate classification result on the pixels outside of the learning tiles. In one embodiment, an average probability of a pixel belonging to the selected object classes is calculated using twenty random forest decision trees.

Figure 11:
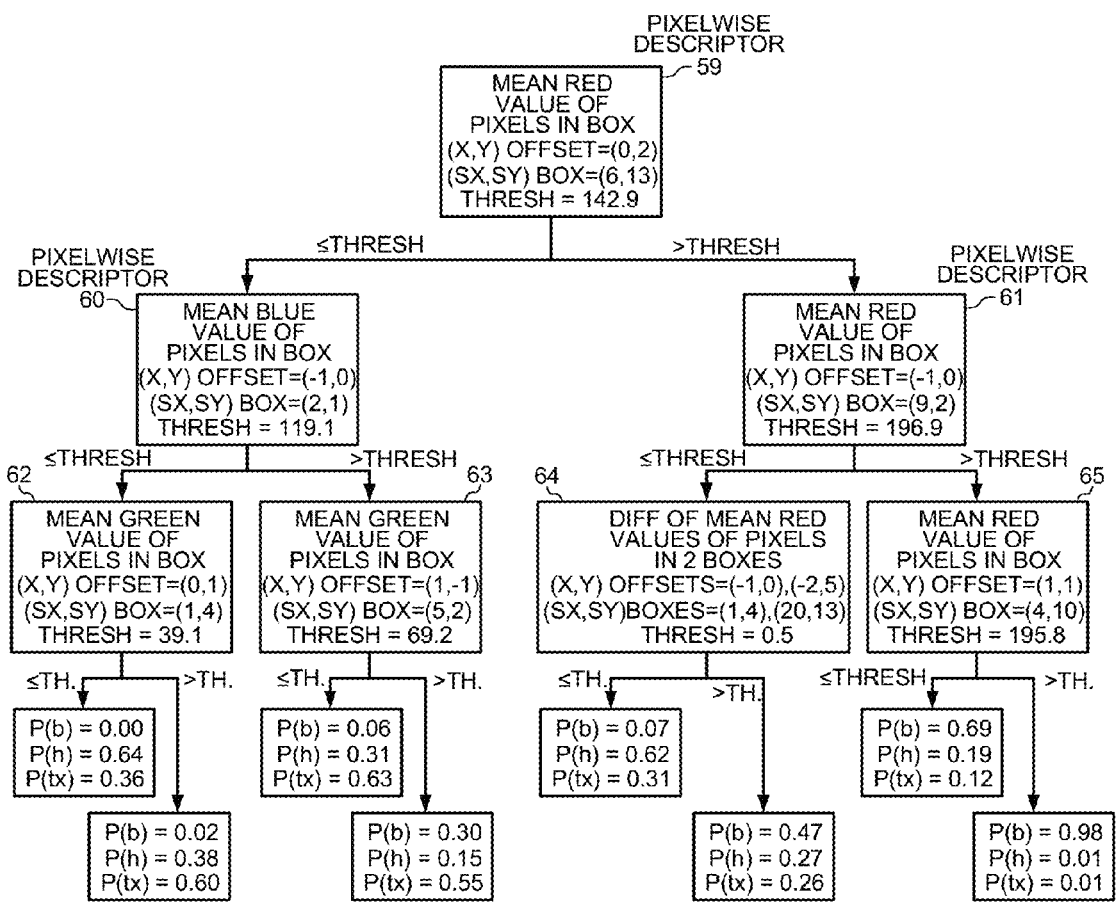
FIG. 11 is a schematic diagram of a decision tree with pixelwise descriptors used to determine the probability that a pixel belongs to an object class.

FIG. 11 is a schematic diagram illustrating how pixelwise descriptors 59-64 are applied in one of the random forest decision trees to determine the probability that a pixel belongs to one of three exemplary object classes. The selected classes are: nuclei with homogeneous contents (h), nuclei with textured contents (tx) (due to dense regions of chromatin) and background objects (b). System 10 trains on random pixels from the learning tiles 51-55 in order to match the class indicated by object-oriented analysis by choosing the appropriate pixelwise descriptors and coefficients of those descriptors to use in pixel-oriented analysis. System 10 matches the class indicated by object-oriented analysis by choosing the type of pixelwise descriptors, the order in which those descriptors are applied in the decision trees, the location of the pixels that are being compared and the comparison threshold used to make each decision.

Figure 12:
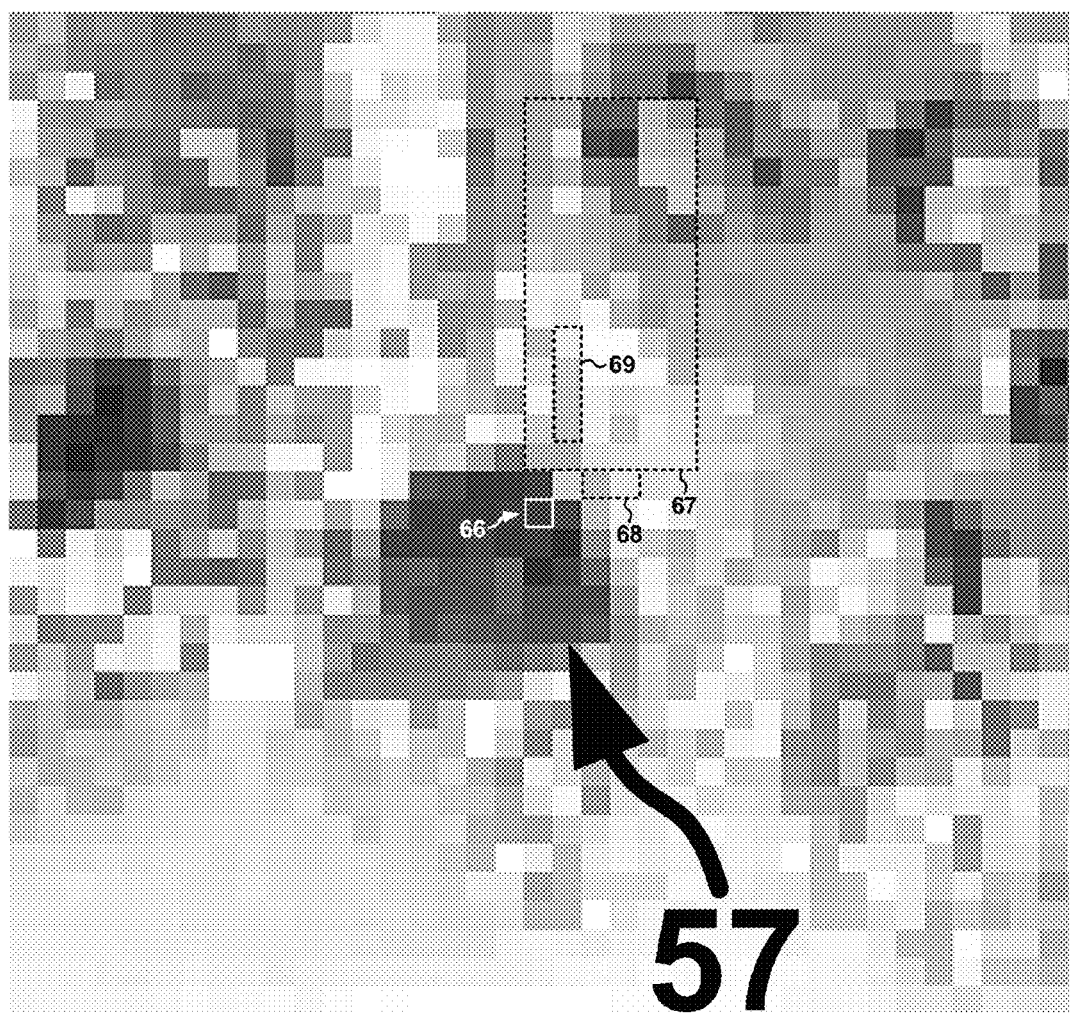
FIG. 12 shows a matrix of pixels including a characterized pixel and a larger box of pixels whose lower left corner is offset from the characterized pixel by two pixels in the y dimension.

In a hypothetical training of the pixelwise descriptors 59-64 on the pixels of learning tile 55, each pixel is first analyzed by pixelwise descriptor 59. Descriptor 59 determines the average red value of the pixels in a 6×13 box of pixels that is offset from the characterized pixel by two pixels in the y dimension (0,2). FIG. 12 illustrates the characterized pixel 66 and the box 67 of pixels whose lower left corner is offset from characterized pixel 66 by zero pixels in the x dimension and two pixels in the y dimension. Pixel 66 belongs to one of the textured nuclei 57 in the segmented image below learning tile 55 in FIG. 10. In this hypothetical implementation, the average red value of the pixels in box 67 is less than the threshold value of 142.9. Therefore, the analysis proceeds along the branch of the decision tree to pixelwise descriptor 60. Descriptor 60 determines the average blue value of the pixels in a 2×1 box 68 of pixels that is offset from characterized pixel 66 by two pixels in the x dimension and one pixel in the y dimension. FIG. 12 also shows box 68 used for the determination of the blue value of the pixels. In this example, the average blue value of the pixels in box 68 is less than the threshold value of 119.1, so the analysis proceeds along the branch of the decision tree to pixelwise descriptor 62. Descriptor 62 determines the average green value of the pixels in a 1×4 box 69 of pixels that is offset from characterized pixel 66 by one pixel in the x dimension and four pixels in the y dimension. In this case, the average green value of the pixels in box 69 is greater than the threshold value of 39.1, so the decision tree of pixelwise descriptors indicates that characterized pixel 66 most probably belongs to the class of objects associated with nuclei that have textured contents. Thus, the decision tree has been correctly trained to indicate the object class determined by object-oriented segmentation.

The decision tree of pixelwise descriptors outputs the posterior probabilities that each pixel belongs to a selected group of object classes, in this example textured nuclei (tx), homogeneous nuclei (h) and background objects (b). The output probabilities are normalized so that the sum of the probabilities of belonging to a class within the selected object classes is 100%. The decision tree indicates that the probability P(tx) that characterized pixel 66 belongs to the object class of textured nuclei 57 is 60%. This pixel-oriented classification corresponds to the result of the object-oriented segmentation shown in FIG. 10 in the segmented image below learning tile 55. Characterized pixel 66 belongs to the textured nucleus 57 at the end of an arrow in FIG. 10. The decision tree predicts that characterized pixel 66 has a 38% probability P(h) of belonging to the object class of homogeneous nuclei and a 2% probability P(b) of belonging to an object class of background objects.

In this embodiment, nineteen other decision trees of pixelwise descriptors are also trained to predict that other random training pixels in the learning tiles have the greatest probability of belonging to those object classes indicated by object-oriented segmentation. Each random forest decision tree of pixelwise descriptors is trained so that, for all of the training pixels of the learning tiles, the same order of descriptors with the same offsets, boxes, thresholds and other coefficients output a highest probability object class that matches the object class determined through object-oriented image analysis in steps 32-33. The parameters of each decision tree are modified during the training mode until the predicted object class for each randomly selected training pixel matches the class of the object to which the training pixel belongs in the hierarchical network 16 generated by object-oriented pixel analysis. The best match is achieved when the highest probability class for all of the selected training pixels is correct, and those indicated probabilities are closest to 100%. The parameters that are modified to achieve the best match are (i) the comparison threshold at each pixelwise descriptor, (ii) the offset of the pixels being compared, (iii) the size and shape of the box of pixels being compared, (iv) the quality of the pixels that is being compared (e.g., average color value), and (v) the order in which the pixelwise descriptors are placed in each decision tree.

The pixelwise descriptors can be more complex than merely comparing an average color value to a threshold. For example, pixelwise descriptor 64 calculates the difference of the average color values in two offset boxes and then compares the difference to a threshold. Yet other pixelwise descriptors compare a threshold to other pixel values, such as (i) the color value of a second pixel at a predetermined offset, (ii) the difference between the color value of the characterized pixel and the color value of a second pixel at a predetermined offset, (iii) the standard deviation among the color values of pixels in a box of predetermined size at a predetermined offset from the characterized pixel, (iv) the difference between the standard deviations of the pixels in two boxes, (v) the sum of the gradient magnitude of the color values of pixels in a box of predetermined size at a predetermined offset from the characterized pixel and at a predetermined orientation, and (vi) the orientation of the gradient edge of the color values of pixels in a box of predetermined size at a predetermined offset from the characterized pixel.

In step 37, the image analysis program then applies the pixel-oriented image analysis of the decision trees of pixelwise descriptors to each of the pixels of the original digital image 46 of stained tissue, including the pixels that are not in learning tiles 51-55 on which object-oriented image analysis was performed. In step 37, without again segmenting digital image 46 into objects, a pixel heat map is generated by applying the pixelwise descriptors to each pixel of the digital image and by assigning to each pixel the color associated with the class of objects to which that pixel most probably belongs. For example, a pixel in image 46 is assigned the color associated with the object class "homogeneous nuclei" in the class network 56 if the decision trees of pixelwise descriptors indicate that the pixel has the greatest probability of belonging to that object class. By assigning object classes to pixels without having to segment those pixels into objects, the superior segmentation results of object-oriented image analysis can be applied to the entire high-resolution digital image 46 in a much less computationally intensive manner. Digital images of stained tissue slices with tens of billions of pixels can be analyzed with the pixelwise descriptors in 3-5 hours as opposed to in about ten hours using full object-oriented processing.

Figure 13:
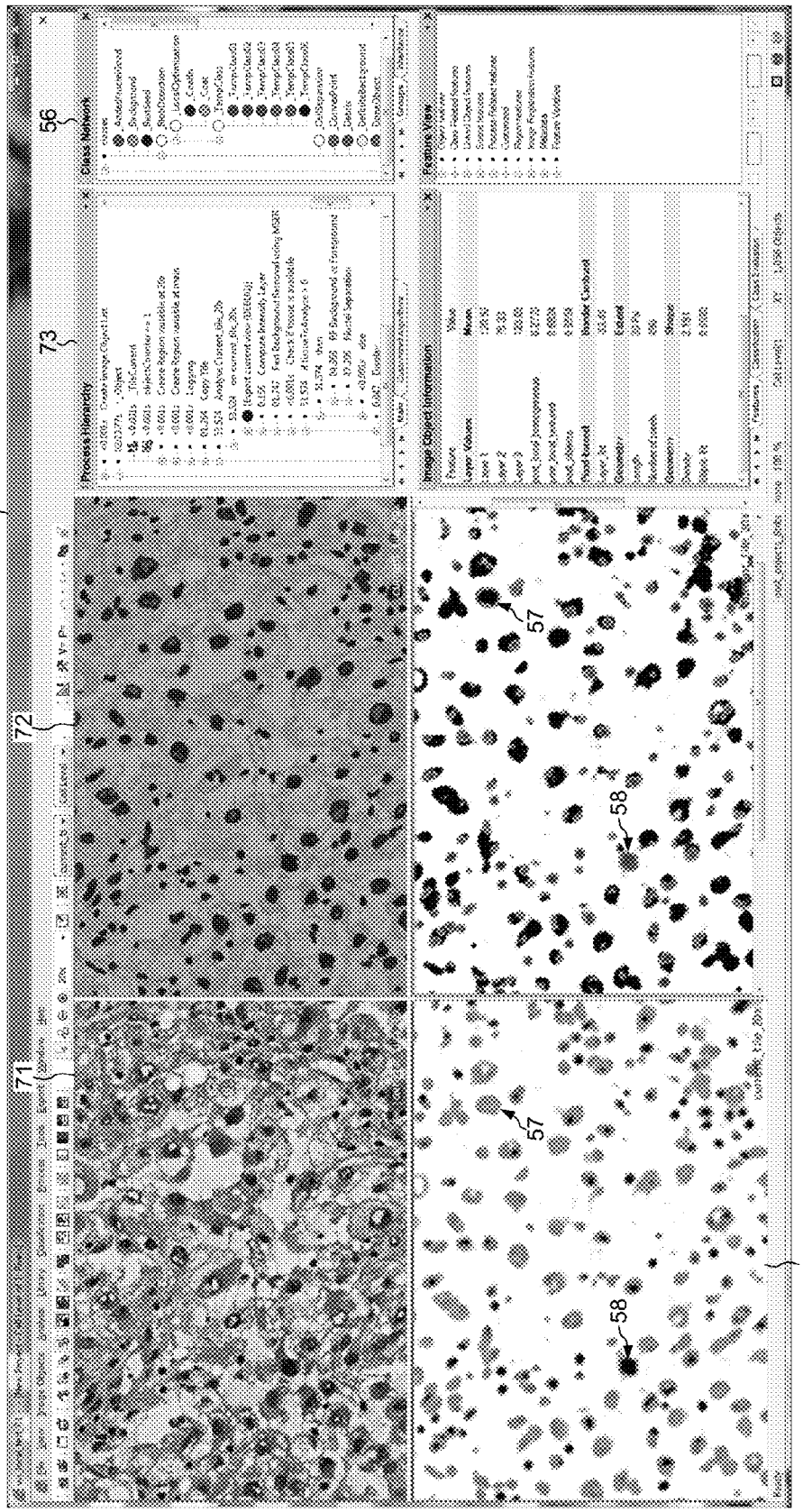
FIG. 13 is a screenshot of the graphical user interface of the system of FIG. 1 with a heat map in which pixels are assigned the colors associated with the object class to which the pixel most probably belongs.

In step 38, the pixel heat map generated in step 37 is displayed on graphical user interface 14. FIG. 13 is a screenshot of graphical user interface 14 showing a pixel heat map 70 in the bottom left frame. Heat map 70 was generated by applying pixelwise descriptors to the original image 71 of stained tissue, a portion of which is shown in the upper left frame. The pixels of heat map 70 are assigned the colors associated with only three object classes: the lighter homogeneous nuclei 57, the darker textured nuclei 58, and white background objects. By outputting posterior probabilities of belonging to only the selected three object classes, extraneous information is removed from heat map 70. The background objects are assigned the color white so that the textured nuclei can more easily be distinguished from the homogeneous nuclei. This pixel-oriented analysis based on a limited number of object classes provides a clearer presentation to a pathologist who is grading and scoring images of stained tissue samples.

The textured nuclei result from chaotically organized chromatin within the nucleus, which is indicative of renal cell carcinoma (RCC) within the stained tissue. Note that the pixels of heat map 70 that have been identified as belonging to the object class "textured nuclei" are associated with nuclei based on characteristics in addition to just the texture of the chromatin. The pixelwise descriptors were trained to match the object-oriented classification of textured nuclei, which also was based on characteristics of objects as opposed to pixels, such as the size of the object, the elliptical fit of the object and the regularity of the object perimeter (concavities in the perimeter). These object characteristics are reflected in the pixelwise descriptors and are recognized in individual pixels. Because the analysis of each pixel is performed independently in the pixel-oriented analysis, segmentation errors are not incorporated into subsequent steps as they are in object-oriented analysis, and the overall classification error rate in the image analysis is reduced.

In FIG. 13, the image frame 72 to the right of original image 71 shows the result of object-oriented segmentation on the original image 71. To the right of image frame 72 is the process hierarchy 73 that lists the steps of the object-oriented analysis used in the segmentation. The class network 56 is shown in the upper right frame of the graphical user interface 14 of FIG. 13. The colors assigned to the classes of objects have not been specially chosen to distinguish the textured nuclei class from the homogeneous nuclei class, so both types of nuclei appear as darker objects. The lower right image frame shows the object-oriented segmentation of frame 72 with a white background and added contrast. It is apparent that textured nuclei 57 can more easily be distinguished from homogeneous nuclei 58 in heatmap 70 than in the lower right image frame.

Figure 14:
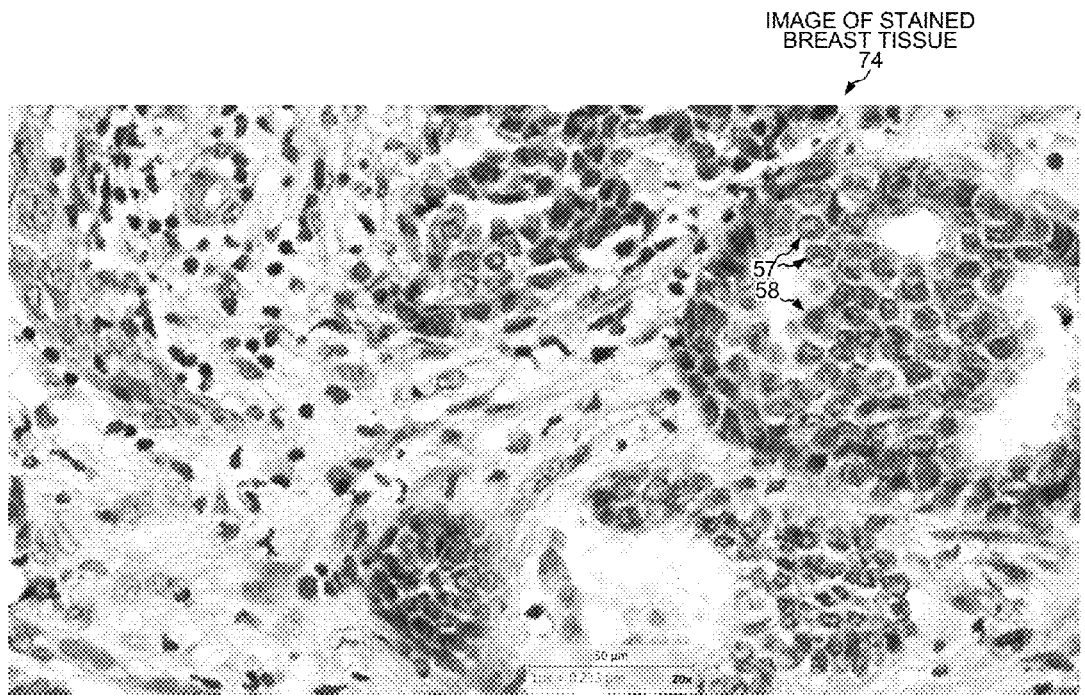
FIG. 14 shows a digital image of a slice of breast tissue stained with hematoxylin and eosin (H&E).
Figure 15:
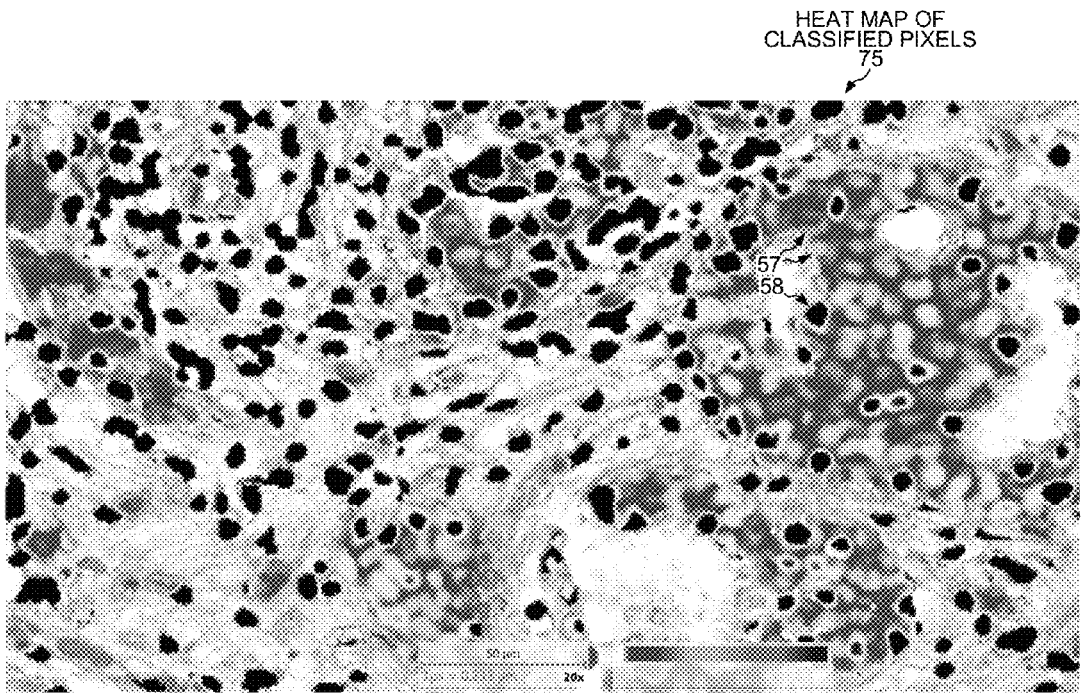
FIG. 15 is a heat map as displayed on the graphical user interface of the system of FIG. 1 after being generated from the image of FIG. 14 using the method of FIG. 3.

FIG. 14 shows a digital image 74 of a slice of breast tissue stained with hematoxylin and eosin (H&E). FIG. 15 is a heat map 75 as displayed on graphical user interface 14 after being generated from image 74 using method 24 of FIG. 3. Object-oriented image analysis is used to segment a small portion of image 74 into the class of textured nuclei 57 and the class of homogeneous nuclei 58. Using method 24, multiple random forest decision trees are generated with pixelwise descriptors that indicate the class of objects to which each of the pixels in the remainder of image 74 most probably belongs. The pixels of the remainder of image 74 are assigned object classes without segmenting the remainder of the image into objects. Heat map 75 is generated by assigning to each pixel of image 74 the color associated with the object class to which that pixel most probably belongs. Thus, no objects are displayed in heat map 75. Instead, contiguous pixels that are assigned the color of the same object class appear to the human observer as objects. Although it is difficult visually to recognize and distinguish the two kinds of nuclei in the original image 74, the darker homogeneous nuclei 58 are readily distinguishable from the lighter textured nuclei 57 in heat map 75.

In FIG. 15, the pixels that most probably belong to the object class of textured nuclei 57 are assigned a shade of the color associated with the class "TexturedNuclei" depending on the magnitude of the probability of belonging to that class. Thus, pixels with a higher probability of belonging to the class "TexturedNuclei" are darker than pixels that most probably belong to that class but yet have a lesser probability of belonging. The differing probabilities of pixels belonging to the class "TexturedNuclei" is demonstrated by the lightest pixels that are likelier to belong to the class of textured nuclei 57 which immediately surround the darker homogeneous nuclei 58.

Figure 16:
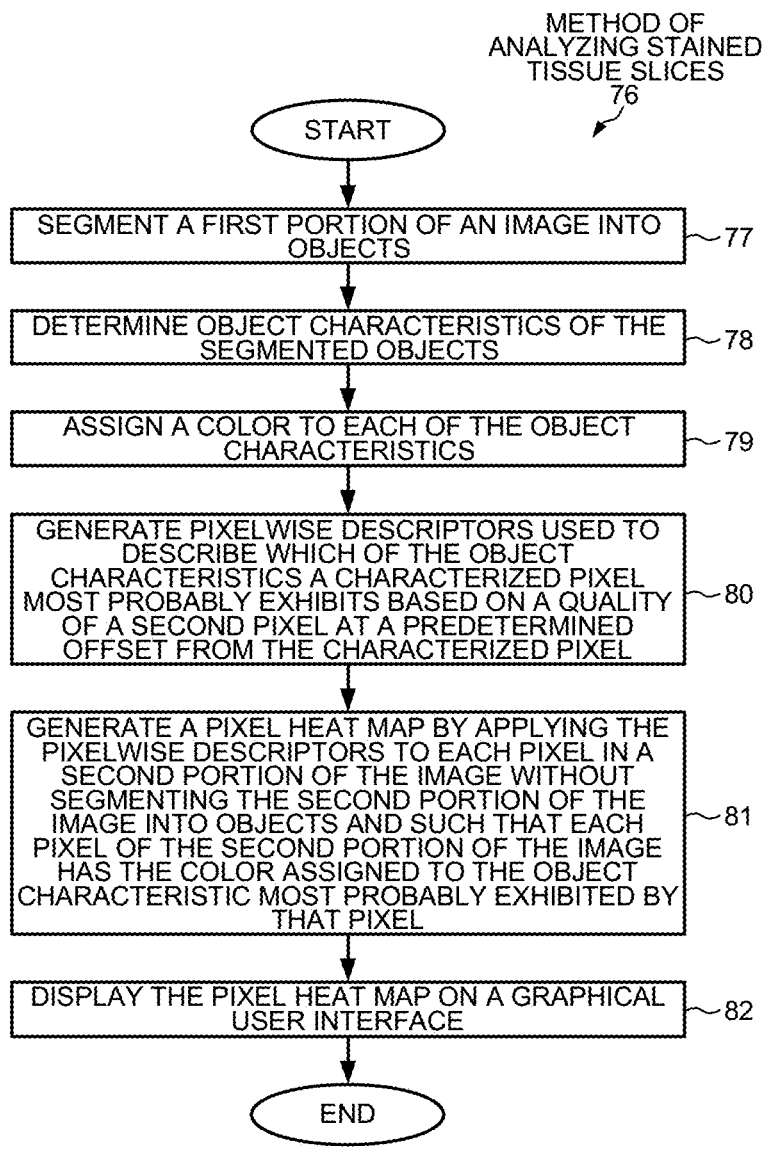
FIG. 16 is a flowchart of the steps of another method by which the system of FIG. 1 trains pixelwise descriptors to indicate the probability that individual pixels in one portion of an image exhibit object characteristics determined by segmenting another portion of the image using object-oriented image analysis.

FIG. 16 is a flowchart of steps 77-82 of another method 76 in which pixelwise descriptors are trained to indicate the probability that individual pixels in one portion of an image exhibit object characteristics determined by segmenting another portion of the image using object-oriented image analysis. Instead of indicating the probability that each characterized pixel belongs to a selected object class, as performed by method 24 of FIG. 3, method 76 generates decision trees with pixelwise descriptors that indicate (i) the object characteristic most probably exhibited by the characterized pixel or (ii) the degree to which the characterized pixel exhibits a selected object characteristic.

Figure 17:
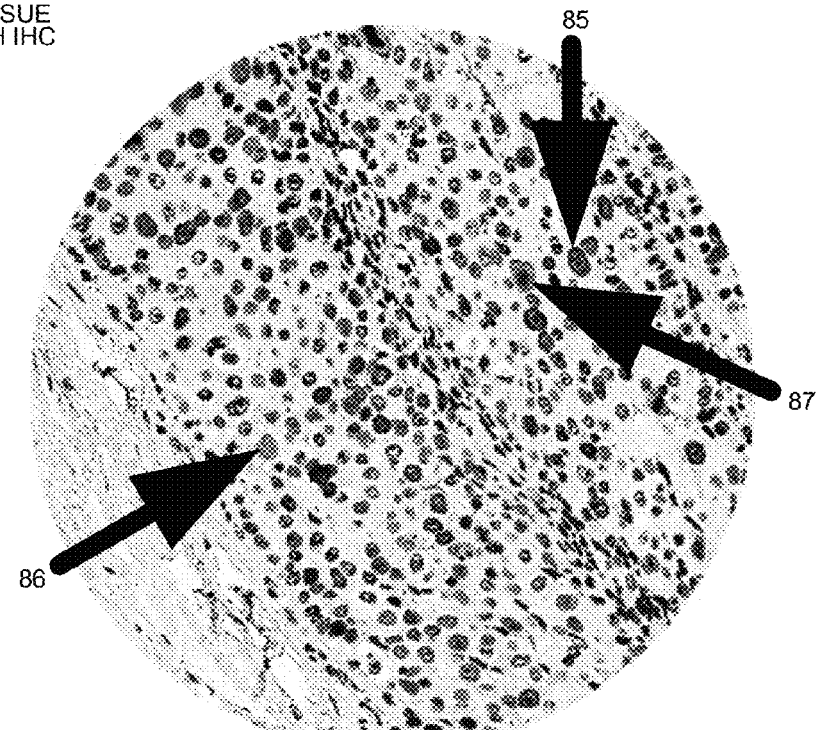
FIG. 17 shows a digital image of breast tissue that has been stained with a protein-specific antibody using immunohistochemistry (IHC).

In step 77, a first portion of an image is segmented into data objects using object-oriented image analysis. FIG. 17 shows a high-resolution image 83 of breast tissue that has been stained with a protein-specific antibody using immunohistochemistry (IHC). For example, cells whose membranes have the HER2 protein are stained brown when the antibody with a brown dye binds to the transmembrane protein HER2/neu. Cells are stained to differing degrees depending on the amount of HER2 protein in their membranes. A small first portion of image 83 is segmented using object-oriented image analysis into data objects classified into various classes, including positively stained cells with HER2 overexpression, cells that do not exhibit HER2 overexpression and background objects.

In step 78, system 10 determines object characteristics of the segmented objects in the first portion of image 83. For example, the object-oriented image analysis determines the elliptical fit of the positively stained cells, the average number of concavities in the perimeters of the positively stained cells, the average size of the positively stained cells, the variation in the sizes of the positively stained cells, the average color of the positively stained cells, the average color of the membranes of the positively stained cells, the average intensity of the positively stained cells, the amount of intensity variation within each of the positively stained cells, and the amount of variation of the average intensity of the positively stained cells. In addition, the object-oriented image analysis quantifies the degree to which the membranes of the positively stained cells have the HER2 protein.

In step 79, system 10 assigns a color to each of the object characteristics determined in step 78. For example, large positively stained cells can be assigns the color orange, while small positively stained cells can be assigned the color green. In addition, positively stained cells with a higher proportion of their membranes stained can be assigned a darker shade of a color, while positively stained cells with a lower proportion of their membranes stained can be assigned a lighter shade of that color.

In step 80, pixelwise descriptors are generated that describe which of the object characteristics a characterized pixel most probably exhibits based on a quality of a second pixel or box of pixels at a predetermined offset from the characterized pixel. Alternatively, the pixelwise descriptors indicate the degree to which the characterized pixel exhibits a selected object characteristic.

In step 81, a pixel heat map is generated by applying the pixelwise descriptors to each pixel in a second portion of the image without segmenting the second portion of the image into objects. Each pixel of the second portion of the image has the color assigned to the object characteristic most probably exhibited by that pixel. Alternatively, each pixel of the second portion of the image has a shade of color indicative of the degree to which the characterized pixel exhibits a selected object characteristic.

Figure 18:
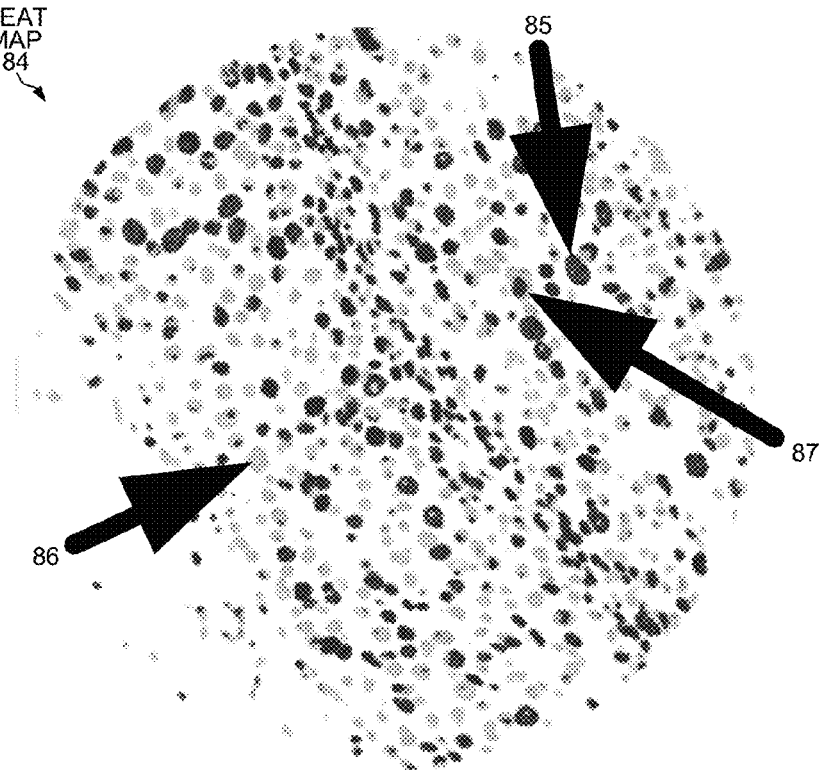
FIG. 18 shows a pixel heat map generated by applying decision trees with pixelwise descriptors to the pixels of a portion of the image of FIG. 17 that has not been segmented into objects.

In step 82, system 10 displays the pixel heat map on graphical user interface 14. FIG. 18 shows a pixel heat map 84 generated by applying decision trees with pixelwise descriptors to the pixels of a second portion of image 83 that has not been segmented into objects. Segmenting using object-oriented image analysis was performed only on a small number of learning tiles (not shown) in FIG. 17. The pixel-oriented analysis using decision trees with pixelwise descriptors is then applied to the entire image 83, including the second portion that was not included in the learning tiles.

In FIG. 18, heat map 84 includes darker shade pixels, lighter shade pixels, and white background pixels. The darker shade pixels have been assigned the color associated with the object characteristic of more membrane staining. The darker shade indicates that the pixel is most probably associated with a positively stained cell having a higher proportion of its membrane stained. The lighter shade pixels have been assigned the color associated with the object characteristic of less membrane staining. The lighter shade indicates that the pixel is most probably associated with a positively stained cell with a lower proportion of its membrane stained.

Three positively stained cells 85-87 are marked in original image 83 in FIG. 17 to illustrate that the color assigned to each pixel of heat map 84 in FIG. 18 corresponds to the degree an object characteristic is exhibited as opposed to merely the class of object. Each of cells 85-87 in image 83 is positively stained brown using IHC. Thus, the membranes of each of the cells 85-87 include the transmembrane protein HER2/neu which is stained with a protein specific antibody with a brown die. However, the degree to which the cell membranes are stained is different. The pixels in heat map 84 at the location of cell 85 have a darker shade indicating that the pixels most probably belong to a cell with a higher proportion of its membrane stained. The pixels in heat map 84 at the location of cell 86 have a lighter shade indicating that the pixels most probably belong to a cell with a lower proportion of its membrane stained. But not all pixels at the location of cell 87 have the same shade. Some of the pixels have a darker shade and have a higher probability of belonging to a cell with more of its membrane stained, while other pixels at the location of cell 87 have a lighter shade and higher probability of belonging to a cell with less of its membrane stained. Thus, the color shades in heat map 84 do not indicate pixels that belong to the object class of positively stained cells and the object class of unstained cells. Instead, the color shades in heat map 84 indicate the degree of a characteristic exhibited by a positively stained cell to which each pixel is most likely associated.

A higher level heat map can easily be generated from a heat map that assigns a color to each pixel depending on the most likely degree to which an object characteristic is exhibited at the location of the pixel. For example, the average value of multiple pixels in heat map 84 can be combined to form a single pixel of the higher level heat map. The shade of each pixel of the higher level heat map indicates an area of the original image 83 in which the cells have a higher or lower proportion of their membranes immunohistochemically stained. A pathologist could use the higher level heat map to navigate to the locations in image 83 that include the highest proportion of cancerous breast tissue cells that exhibit a high degree of HER2 overexpression. Alternatively, a higher level heatmap can easily be generated by applying the pixelwise descriptors only to every kth pixel in a second portion of the image.

In another example, the object characteristic indicated by the decision trees of pixelwise descriptors is the size of the nuclei. Pixels most probably belonging to larger nuclei are assigned a different color than pixels most probably belonging to smaller nuclei. Pixels in the higher level heat map indicate the locations in the original image in which the nuclei are larger and more likely to be cancerous.

Data analysis server 13 includes a computer-readable storage medium having program instructions thereon for performing method 24 and method 76. Such a computer-readable storage medium includes instructions of the image analysis program for generating data objects corresponding to patterns in digital images that have been stained by a particular biomarker. The computer-readable storage medium also includes instructions for generating decision trees of pixelwise descriptors that indicate the probability that a pixel belongs to an object class without segmenting the portion of the image in which the pixel is located.

In another embodiment, system 10 more quickly and accurately identifies the appearance of a particular cancer tissue of a target patient by developing pixelwise descriptors using images of similarly stained tissue of N other patients. System 10 is trained on the images from the N other patients using object-oriented image analysis to generate pixelwise descriptors that recognize the morphology of the cancer tissue in the image of the target patient. The image analysis of the stained tissue of the target patient is thereby performed faster because the computationally intensive object-oriented segmentation of the sample tissue of the N other patients can be performed at an earlier time and stored in the database 12 of system 10. No object-oriented segmentation need be performed on the stained tissue of the target patient.

In another embodiment, pixelwise descriptors are generated from segmented and classified objects stored in the database 12 of system 10, and no object-oriented segmentation or learning of pixelwise descriptors need be performed on images of the target patient. The training on the images from the N other patients ensures a high reproducibility and high robustness of the analysis. If an image of a target patient is analyzed using the method of FIG. 3 and a particular type of tissue is present only in a second portion of the target image but not in the analyzed portion of the target image, the method of FIG. 3 would not reliably detect that particular type of tissue in the second portion of the target image. For example, if the target image contains a single CD8-positive cell, it is possible that this cell is not in the first portion of the target image that is used for training in the method of FIG. 3. When the heatmap is generated at the location where the CD8-positive cell is located, the method of FIG. 3 would not have been trained to recognize the CD8-positive cell. The current embodiment, however, uses the images from the N patients to increase the likelihood that more different types of tissue are present, are detected and are used to train the system. The likelihood that system 10 will not encounter a CD8-positive cell in any of the N patients decreases with a larger the number N of patients and a larger number of analyzed portions from each image of the N patients. A safety check can be included in the current embodiment that ensures that all expected types of tissue for the current staining protocol are actually present, detected and used for training the pixelwise descriptors. If a particular type of image object that is expected to be present is not detected, additional portions of the images of the N patients are selected, segmented into objects and further classified by system 10 until the expected objected are found. If a particular type of expected image object is still not detected, system 10 displays an error message to the user.

System 10 is trained both on objects detected and classified in the images of the N other patients and on objects detected and classified in the target image. The current embodiment incorporates steps of the method of FIG. 3 to train system 10 both on the appearance of tissue of the target patient as well as of the N other patients so as to ensure that each expected type of tissue is detected and used for training the pixelwise descriptors. System 10 is trained on the objects detected both in the images from the N patients and in the image from the target patient.

In another embodiment, system 10 analyzes the images of the N patients to identify a cluster of tiles from those images depicting tissue that best matches the tissue of the target patient. Then system 10 is trained only on the objects detected in that cluster of best matching tiles.

FIGS. 19A-B show a flowchart of steps 88-116 of a method 117 by which analysis system 10 can faster and more accurately recognize patterns in digital images of stained tissue slices using both object-oriented analysis and pixel-oriented analysis. FIG. 19A shows steps 88-108.

In a first step 88, a high-resolution digital image is acquired of a tissue slice of a first of N patients that has been stained with a particular biomarker. In a first implementation, digital images are acquired from forty-four patients (N=44) whose prostate tissue has been stained with the CD8 antibody. The CD8 antibody is a surface protein that serves as a co-receptor for the T cell receptor and identifies cytotoxic T cells by staining their membranes. The role of cytotoxic T cells is to kill cancer cells, viruses and damaged cells. Staining with CD8 is used to provides insight into how the immune system and in particular cytotoxic T cells specifically attack the cancer cells in an individual patient. A precise description of the interaction between the immune system and the cancer region is crucial for making better informed therapeutic decisions as well as for predicting the clinical outcomes of individual patients. Alternatively, the tissue slices are stained with the protein specific antibody p63, which identifies basal epithelial cells by staining the nuclei inside the basal epithelial cells. Staining with p63 is used to differentiate prostatic adenocarcinoma (the most common type of prostate cancer) from benign prostatic tissue. Expression of the p63 gene is down-regulated in adenocarcinoma of the prostate compared with normal prostate tissue. Thus, p63 stains the nuclei of basal epithelial cells in healthy prostate glands. In yet another implementation, the tissue slices are stained with cytokeratin 18 (CK18), which stains luminal epithelial cells. CK18 is a protein-specific monoclonal antibody (a biomarker) that in humans is encoded by the gene KRT18/PIG46/CYK18. CD8, p63 and CK18 are used together with an attached dye to form a stain. Note that some biomarkers do not require an attached dye, such as hematoxylin and eosin (H&E), which has the ability to stain tissue without the addition of a dye. In yet another implementation, the tissue slices are stained with hematoxylin and eosin (H&E).

FIG. 20 shows an exemplary high-resolution digital image 124 of the tissue slice of the first of the N patients. First digital image 124 depicts prostate tissue that has been stained with the CD8 antibody. The slice of the stained prostate tissue was placed on a slide before the digital image was scanned.

In a next step 89, first digital image 124 is divided into first tiles. FIG. 21 shows how digital image 124 is displayed in tiled sections 125 on graphical user interface 14 of system 10 after step 89 is performed.

In step 90, system 10 determines the degree of local contrast in each of first tiles 125. The degree of local contrast is determined in a manner similar to that performed in step 27 of method 24. An intensity threshold is set at the average intensity of the pixels in each tile. The pixels are divided into one group whose intensities are above the threshold and another group whose intensities are below the threshold. Regions of contiguous pixels in the two groups are then identified. Then the intensity threshold is incrementally changed, and the regions of contiguous pixels in the two groups are again identified. The regions that remain stable despite the change in the intensity threshold are the maximally stable extremal regions (MSER).

In step 91, a first subset 126 of the first tiles 125 is identified in digital image 124 in a manner similar to that performed in steps 28-31 of method 24. In one embodiment, ten first learning tiles are selected. The ten learning tiles of the first subset 126 that exhibit the highest stability of contrast are depicted in FIG. 21 with bold outlines. FIG. 22 shows the ten tiles 126 in more detail assembled in a 2-by-5 array. Steps 88-91 represent a block 118 of steps in which a subset of tiles from the image of the Nth patient is selected.

In step 92, an intermediate contrast region is identified in each of the tiles of the first subset 126. FIG. 23 shows the low, intermediate and high contrast regions that system 10 has identified in the ten tiles 126. The regions 127 with the lowest local contrast are colored black and correspond to background areas of the image 124. Such low contrast regions exist in areas without tissue located, for example, inside glands and tubules of the thinly sliced tissue. The areas 128 of the tiles 126 correspond to a mixture of cellular and stromal regions and are colored gray in FIG. 23. The intermediate contrast region 129 within the tiles of the first subset 126 corresponds to stromal regions and is colored white in FIG. 23.

System 10 uses the intermediate contrast region 129 to compare the similarity of tissue between patients. The regions 128 are not used to train the pattern recognition functionality of system 10 because those regions of high local contrast depict mostly a mixture of stromal and cellular regions that are more difficult to segment than pure stromal regions. This makes it more difficult to achieve a robust and accurate identification of similar objects across multiple images based on these regions and further challenges the computation of a robust and accurate reference quantity across multiple images that can be used to characterize the appearance of a particular image. At the opposite, the intermediate contrast regions 129 solely depict tissue such as stroma and tissue between cells. This type of region is simpler to detect systematically and can be accurately and robustly identified across multiple images, therefore making it possible to define a robust and accurate reference quantity to characterize the appearance of a particular image.

In step 93, a CIELAB color is calculated from the RGB color of each pixel in each intermediate contrast region 129. The CIELAB color better characterizes the human perception of color than does the RGB color. The CIELAB color L*a*b of each pixel has a 3-digit lightness value L, a 3-digit "a" color channel, and a 3-digit "b" color channel. The lightness value L ranges between 0 (black) and 255 (white). The "a" value ranges between 0 (green) and 255 (red). The "b" value ranges between 0 (blue) and 255 (yellow). In another embodiment, the Hue Saturation Value (HSV) color space is used. In yet another embodiment, the RGB color space is used.

In step 94, a mean vector is calculated for all of the pixels in each intermediate contrast region 129 of each tile in the first subset of first tiles 126. The mean CIELAB vector for each tile has three numbers, which are the averages of the L, a and b values of all of the pixels in the intermediate contrast region 129 of the tile. FIG. 24 illustrates the calculation of the mean vector for the second 130 and the sixth 131 tiles of the first subset 126. For example, the average color of all of the pixels of the second tile 130 that are located within the intermediate contrast region 129 marked as white is expressed by the mean vector {175.7951545, 130.5271071, 116.1030000}. The average L*a*b values of the mean vector are rounded to three digits in FIG. 24. In step 95, a standard deviation vector is calculated based on the mean vectors of all of the tiles in the first subset 126 of first tiles 125. FIG. 25 illustrates the calculation of the standard deviation vector for the ten tiles of the first subset 126. The standard deviation vector for the first subset 126 has three numbers, which are the standard deviations of each of the L, a and b values of the mean vectors of the ten tiles.

In step 96, a first $l^2$ Euclidean norm is generated from the standard deviation vector of the first subset 126 of first tiles 125. The $l^2$ norm is the square root of the sum of standard deviations squared. The calculation of the $l^2$ norm for the first subset 126 of tiles from the first of N patients is shown in FIG. 25. The $l^2$ norm for the tiles from the first of N patients is 1.6322. The $l^2$ norm indicates the magnitude of the standard deviation of color of the intermediate contrast regions 129 of the first subset 126 of tiles from the first of N patients. System 10 uses the $l^2$ Euclidean norm to identify patients whose tissue, including cancerous tissue, is most similar. Steps 92-96 represent a block 119 of steps in which the color characteristics of the image of the Nth patient are analyzed.

In step 97, the previous steps 88 through 96 are performed on each of N digital images of stained tissue of N patients to generate N $l^2$ Euclidean norms from the N standard deviation vectors of the N subsets of tiles from the N patients. For each of the N patient, the heterogeneity of color in the respectively selected subset of tiles is indicated by an $l^2$ norm. For example, a second digital image is acquired of a stained tissue slice of a second of N patients in the second iteration of step 88. The tissue of the second patient is also prostate tissue that has been stained with the same biomarker (the CD8 antibody) used with the first patient. The second digital image is divided into second tiles in the second iteration of step 89. In step 90, the degree of local contrast in each of the second tiles is determined by identifying maximally stable extremal regions (MSER). In step 91, a second subset 132 of the second tiles is selected that exhibits the greatest degree of local contrast. Ten tiles are identified in the second image that exhibit the highest stability of local contrast. FIG. 26 shows the ten tiles of the second subset 132 assembled in a 2-by-5 array. In the second iteration of step 92, an intermediate contrast region 133 is identified in each of the tiles of the second subset 132.

FIG. 26 shows the low, intermediate and high contrast regions in the tiles of the second subset 132. The black regions 134 with the lowest local contrast correspond to non-tissue background areas of the second image. The gray areas 135 exhibit a high local contrast and correspond to a mixture of cellular and stromal regions. And the white regions 133 within the tiles of the second subset 132 exhibit an intermediate local contrast and correspond solely to stromal regions and regions between cells. In step 93, a CIELAB color is calculated for each pixel in the intermediate contrast region 133. In step 94, a mean vector is calculated for all of the pixels in each intermediate contrast region 133 of each tile in the second subset 132 of second tiles from the second patient. FIG. 26 illustrates the calculation of the mean vector for the second 136 and the tenth 137 tiles of the second subset 132. For example, the average color of all of the pixels of the second tile 136 that are located within the white intermediate contrast region 133 is expressed by the mean vector {144, 135, 105}.

In the second iteration of step 95, a standard deviation vector is calculated based on the mean vectors of the tiles in the second subset 132. FIG. 27 illustrates the calculation of the standard deviation vector for the ten tiles of the second subset 132. In step 96, a second $l^2$ Euclidean norm is generated from the standard deviation vector of the second subset 132 of the second tiles. The calculation of the $l^2$ norm for the second subset 132 of tiles from the second of N patients is shown in FIG. 27. The $l^2$ norm for the tiles from the second of N patients is 15.1567. The l^2 norm indicates the magnitude of the standard deviation of color of the intermediate contrast regions 13 of the second subset 132 of tiles from the second of N patients. Because the l^2 norm of the second subset 132 is larger than the l^2 norm of the first subset 126, the tiles of the second image from the second patient are less homogeneous in color than are the tiles from the first patient.

In step 98, the N l^2 norms estimated from the N digital images of the N patients are used to estimate a reference l^2 norm value as the most common l^2 Euclidean norm from among the N digital images. One method to determine the most common l^2 norm is to generate a histogram showing how often each magnitude range of the l^2 norm occurred in the N subsets. Thus, the histogram shows the number of occurrences of each magnitude of the l^2 norm in the forty-four patients. The histogram entries can be filtered by averaging the number of occurrences of each l^2 norm value over five neighboring values (two on either side). The missing extreme left and right boundary entries are set to zero. FIG. 28 shows a histogram with filtered entries of the number of occurrences of each l^2 norm magnitude range. The histogram shows that the most common l^2 Euclidean norm from among the forty-four digital images is five. The most common l^2 Euclidean norm is an indication of the most prevalent variation among the CIELAB color values within the images of the N patients. Steps 97-98 represent a block 120 of steps in which the most common color characteristics from among the N patients are determined.

In the block 121 of steps 99-104, a subset of representative tiles is selected from among the tiles of the N patients. Ten tiles were selected from each of the forty-four patients by repeating steps 88-91 for each patient, to yield a total of 440 tiles. The analysis performed by method 117 is accelerated by performing steps 105-116 only on the selected subset of tiles. In one implementation, a smaller subset of one hundred tiles are selected for analysis from among the 440 tiles.

In step 99, all the selected tiles from the N patients (e.g., 440 tiles) are grouped into a single, unique set of tiles. In step 100, a color histogram is computed for each tile in the single set of 440 tiles. In one embodiment, three histograms corresponding to the three Lab pixel values are computed. In another embodiment, a three-dimensional histogram of the Lab pixel values is computed. In yet another embodiment, a histogram is computed in another color space, such as the RGB or the HSV color spaces.

In step 101, the distances between each possible pair of tiles in the single set of tiles are computed based on the histogram. Given a first tile in the single set of 440 tiles, the distance to the remaining 439 is computed. The distance between two tiles is defined by the mean of the three correlation coefficients between the three Lab histograms of the first tile and the three Lab histograms of a second tile, out of the 439 remaining tiles. If two tiles have the same three Lab histograms, the distance between the two tiles is 0. If two tiles have their three Lab histograms which are uncorrelated, the distance between the two tiles is 1. In yet another embodiment, the correlation coefficient between the three-dimensional Lab histogram of the first tile and the three-dimensional Lab histogram of the second tile is used. In another embodiment, the chi-squared measure is used instead of the correlation coefficient to compare two histograms. In yet another embodiment, the sum squared distance is used instead of the correlation coefficient to compare two histograms.

In step 102, the most representative tile among the single set of 440 tiles is selected as the tile that minimizes its mean distance to all the other 439 tiles. The most representative tile is put into a separate set of tiles that is denoted as the subset of representative tiles in the subsequent steps. At the end of step 102, the initial set of tiles contains 439 tiles in this example, and the subset of representative tiles contains a single tile.

In step 103, the most different tile within the initial set of tiles to the tiles in the subset of representative tiles is selected and is moved from the single set of tiles to the subset of representative tiles. The most different tile within the single set of tiles is defined as the tile that maximizes its minimum distance through the representative tiles. Step 103 is repeated to select a total of K tiles. In this example, K=100 representative tiles are selected out of the single set of 440 tiles. In the first iteration of the step 103, system 10 selects the tile from among the 339 tiles in the single set of tiles that maximizes its distance to the unique tile in the subset of representative tiles and moves it to the subset of representative tiles. The subset of representative tiles now contains two tiles. In the second iteration, the system 10 computes for each of the 338 remaining tiles in the single set of tiles its minimum distance to the two tiles in the subset of representative tiles, selects the tile within the single set of tiles that maximizes the minimal distance, and moves it to the subset of representative tiles. At the end of the second iteration in this example, the single set of tiles contains 437 tiles, and the subset of representative tiles contains three tiles. At the end of the 99th iteration of step 103, the single set of tiles contains 340 tiles, and the subset of representative tiles contains one hundred tiles.

In step 105, system 10 clusters the K representative tiles into multiple subsets of tiles. The K representative tiles selected from the N subsets of tiles are successively separated into clusters until each cluster exhibits an l^2 Euclidean norm whose magnitude is less than the most common l^2 Euclidean norm. Each of the estimated clusters is as homogeneous with respect to its color variations as an image commonly encountered among the N images. The mean CIELAB vector of each of the K representative tiles is used to separate the tiles into clusters. The mean vectors of the tiles are plotted as a cloud in the three-dimensional space of L, a and b. Then the plotted points are separated into two clusters using "k-means" clustering, where k equals two. System 10 determines the standard deviation vector for the tiles in each cluster and the l^2 norm based on the standard deviation vector. If the l^2 norm for each cluster is higher than the most common l^2 norm determined in step 98, then the cluster is separated again into two new clusters using k-means clustering.

FIG. 29 illustrates the successive separation of the K representative tiles into clusters until each cluster exhibits an l^2 norm whose magnitude is less than the most common l^2 norm. The l^2 norm is twelve for the set of representative tiles 138. Because twelve is greater than the most common l^2 norm of five displayed in FIG. 28, the tiles 138 are separated into two clusters 139-140. The l^2 norm of cluster 139 is seven, and the l^2 norm of cluster 140 is 6.6. Because the l^2 norm of the cluster 139 is higher than the most common l^2 norm, cluster 139 is separated into the two clusters 141-142. Because the l^2 norm of the cluster 140 is higher than the most common norm, cluster 140 is separated into the two clusters 143-144. The clusters 141-144 contain 16, 46, 22 and 16 tiles, respectively, which are shown at the bottom of FIG. 29. The cluster 141 has an l^2 norm of 4.5, which is less than the most common l^2 norm. Thus, the tissue depicted in the tiles of the cluster 141 is as homogeneous as a typical image among the N images and is determined to be sufficiently homogeneous to characterize the appearance of a particular type of tissue. Similarly, the clusters 142-144 have l^2 norms of 4.25, 2.9 and 3.42, respectively, which are less than the most common l^2 norm. Thus, the tissue depicted in the tiles of each cluster is as homogeneous as a typical image among the N images and is sufficiently homogeneous to use for characterizing the appearance of a particular type of tissue.

In step 106, a mean-of-means vector is calculated for each cluster using the mean CIELAB color vector obtained from the intermediate contrast region of each tile in each cluster. In step 107, the tiles in each cluster are segmented into objects and the objects classified into classes of objects. FIG. 30 illustrates object-oriented segmentation performed on a tile 145 of cluster 144 in FIG. 29. The image analysis program of system 10 uses object-oriented image analysis to generate data objects of a hierarchical semantic network by linking selected pixels to the data objects according to a classification network and according to a process hierarchy of steps and algorithms. FIG. 30 shows a processed image 146 in which segmented objects are colored to correspond to their classification. For example, the darker objects in processed image 146 are members of the "nucleus" class of objects. These "nucleus" objects do not necessarily correspond to the darkest pixels in tile 145 but are rather assigned a darker color after their classification. Characteristics of objects that belong to distinct classes of objects are determined for the objects in each of the clusters. As performed in step 35 of method 24, system 10 determines the distinguishing characteristics that identify data objects as belonging to a particular class. Such class characteristics: the elliptical fit of an object, the average number of concavities of the perimeter of the object, the average size of objects in the class, the variation in sizes of the objects of the class, the average color of the object, the average color of subobjects within an object, the average intensity of objects of the class, the amount of intensity variation within an object, and the amount of variation of the average intensity of the objects of the class.

In step 108, system 10 determines that each cluster contains a sufficient number of objects from each class. In one embodiment, system 10 checks that each cluster contains at least ten objects classified as cells whose membranes are marked by the CD8 antigen. In another embodiment, system 10 checks that each cluster contains at least ten objects classified as nuclei marked with tumor protein p63. If the system detects that not enough objects of a required class have been detected, the number of tiles in the subset of representative tiles is increased, and steps 103-108 are repeated until each cluster contains the minimum number of objects in each characterized class. If the maximum number of representative tiles has been selected, i.e., if the subset of representative tiles contains all the tiles in the single set of tiles and that the minimum number of objects of a class has not been detected, system 10 displays an error message on the user interface to notify the user. The results of the object-oriented segmentation and classification of images of tissue from other patients are stored in database 12 for later comparison with the tissue of the target patient. In the block 122 of steps 105-108, the subset of representative tiles are clustered into groups of tiles with common color characteristics.

FIG. 19B shows steps 109-116 of method 117, which make up block 123 in which a heatmap is generated and displayed using the image of the target patient. Starting with step 109, the cluster of tiles whose tissue most closely resembles the tissue of the target patient is determined. Steps 88 through 94 are performed on the target digital image of stained tissue of the target patient to generate the mean vector for all of the pixels in each intermediate contrast region of each of the subset tiles of the target digital image. The average L, a and b values are obtained from the intermediate contrast regions.

In step 110, a mean-of-means vector is calculated for the target patient using the mean vector of each of the subset tiles of the target digital image. For example, for the cluster 141 the mean-of-means vector includes the average L, a and b values calculated from the average L, a and b values from each of the sixteen tiles in the cluster.

In step 111, a difference vector is calculated for each cluster by subtracting the mean-of-means vector for the target digital image from the means-of-means vector for each cluster. For example, the difference vector for cluster 141 is $\{M_{L141}-M_{LT}, M_{a141}-M_{aT}, M_{b141}-M_{bT}\}$, where $M_{LT}$ is the mean-of-means L value for the subset tiles of the target image. System 10 generates a cluster l^2 Euclidean norm of the difference vector for each cluster. The cluster l^2 norm is the square root of the sum of the squared difference elements of the difference vector. The magnitude of the cluster l^2 norm indicates the degree by which the colors of each cluster of tiles differ from the colors of the subset tiles of the target image. The cluster that is most similar to the target image has the smallest cluster l^2 norm. In step 112, the objects that have been segmented and classified by the system 10 on the cluster of tiles which is the most similar to the target image are selected. In the sample calculations of FIG. 29, cluster 144 has the smallest cluster l^2 Euclidean norm, so the tissue of the target patient most closely resembles the tissue depicted in the tiles of cluster 144.

In step 113, the tiles in the subset associated with the target patient are segmented into objects and the objects classified into classes of objects using the same image analysis program as in method 24 and in step 107 of the method 117. Characteristics of objects that belong to distinct classes of objects are determined for the objects in each of the cluster. As for step 107, system 10 determines the distinguishing characteristics that identify data objects as belonging to a particular class.

In step 114, pixelwise descriptors are generated that indicate the class of objects to which each pixel in the tiles of the most similar cluster 144 and in the subset of tiles from the target patient most probably belongs. System 10 trains the pixelwise descriptors using a visual context model developed on the objects detected in steps 107 and 113 using object-based image analysis. As performed in step 36 of method 24, system 10 generates pixelwise descriptors that indicate the most likely object class associated with each pixel without referencing any data objects. Purely pixel-oriented image analysis can then be performed using the descriptors. As described above with regard to method 24, the pixelwise descriptors indicate the probability that a characterized pixel belongs to a class of objects based on a characteristic of other pixels at a predetermined offset from the characterized pixel. The class probability of each pixel is the average result obtained using multiple decision trees of pixelwise descriptors. The various decision trees are trained with random different pixels from the tiles of the most similar cluster so that the average probability of belonging to a particular object class in the execution mode of the image analysis program is obtained from a random forest of decision trees in which overfitting to particular training pixels is avoided.

In step 115, a pixel heat map is generated from the target digital image of the target patient without segmenting the target digital image into objects by applying the pixelwise descriptors from step 114 to each pixel of the target digital image. System 10 thereby identifies the morphology of particular cancer tissue of a target patient by developing pixelwise descriptors using images of similarly stained tissue of other patients as well as the image of the target patient itself. A quicker pixel-oriented analysis can be performed on the digital image of the target patient with an accuracy that is achievable only with the slower and more computationally intensive object-oriented segmentation by using the object-oriented segmentation performed earlier on tissue determined to be similar to that of the target patient and on a small portion of the target patient.

In step 116, the pixel heat map generated from the digital image of the target patient is displayed on graphical user interface 14. For illustration purposes, FIG. 31 shows a pixel heat map 147 generated from tile 145 of cluster 144 as opposed to from an image from a target patient. Heat map 147 of FIG. 31 can be compared with processed image 146 of FIG. 30 that was obtained by object-oriented segmentation of tile 145. Pixel heat map 147 was generated by applying pixelwise descriptors to the image of stained tissue of tile 145. The pixels of heat map 147 are assigned the colors associated with only two object classes: the lighter areas around stained nuclei 148 and the darker background objects 149. By assigning all objects to just two object classes, extraneous information is removed from heat map 147. The pixel-oriented analysis based on a limited number of object classes provides a clearer presentation to a pathologist who is grading or scoring images of stained tissue samples.

Alternatively, each pixel of the target digital image is assigned the color associated with an object characteristic most probably exhibited by that pixel as opposed to simply the object to which the pixel most likely belongs. For example, instead of assigning the same color to all nuclei, one color can be assigned to pixels that likely belong to nuclei that contain textured DNA, and another color can be assigned to pixels that likely belong to nuclei whose DNA is more homogeneously disbursed. In another example, one color is assigned to pixels that likely belong to round healthy cells, whereas another color is assigned to pixels that likely belong to irregularly shaped cancerous cells.

Multiple embodiments of the image analysis using pixelwise descriptors are possible by practicing selected steps of method 117. A primary embodiment involves steps 88-91, 107-108, 112 and 114-116. A unique cluster containing all of the tiles from the N subsets from N patients is defined in step 107, and only the objects from this unique cluster are considered for generating the pixelwise descriptors in step 114.

A secondary embodiment involves steps 88-91, 107-108 and 112-116. A unique cluster containing all of the tiles from the N subsets from N patients is defined in step 107, and both the objects from this unique cluster and the objects segmented in the subset of tiles associated to the target patient are used to generate the pixelwise descriptors in step 114.

A tertiary embodiment involves steps 88-98, 105-112 and 114-116 in which the K representative tiles in step 105 are used as the tiles from the N subsets from N patients. Only the objects from the closest cluster are considered for generating the pixelwise descriptors in step 114.

For each cluster identified in step 107, the pixelwise descriptors and the mean-of-means vector based on the objects associated to the cluster are stored in database 12 and are retrieved from the database 12 based on the proximity of the target patient to the different clusters stored in the database.

Yet another embodiment involves the steps 88-98 and 105-116 in which the K representative tiles in step 105 are used as the tiles from the N subsets from N patients.

Yet another embodiment involves all of the steps 88-116 such that the selection of the K representative tiles is performed from the tiles from the N subsets from N patients in steps 99-104.

FIG. 32 is a flowchart of steps 150-158 of a method 159 for recognizing patterns in digital images of stained tissue using both object-oriented segmentation and pixel-oriented image analysis. Pixelwise descriptors can be trained using assay-based learning from similar tiles of other patients or alternatively also using case-based learning from that tiles of the target patient.

In a first step 150, digital images of stained tissue of a plurality of cancer patients are divided into tiles. In step 151, the tiles are separated into clusters of tiles with pixel characteristics that are similar. For example, the mean color vector of each tile is plotted in the three-dimensional space of L, a and b, and the cloud of plotted points is then separated into clusters using k-means clustering.

In step 152, a matching cluster of tiles is identified whose pixel characteristics most closely match the pixel characteristics of a target digital image of stained tissue of a target patient. For example, the cluster that best matches the target digital image is identified based on the difference vector for each cluster. The difference vector for each cluster is calculated by subtracting the mean-of-means vector of the target digital image from the means-of-means vector for each cluster. Then a cluster $l^2$ norm of the difference vector for each cluster is calculated. The cluster with the smallest cluster $l^2$ norm best matches the target image.

In step 153, the tiles of the matching cluster are segmented into objects using computationally intensive, object-oriented image analysis. Alternatively, the object-oriented segmentation is also performed on a subset of tiles from the target image that exhibit the greatest degree of local contrast. Tiles of the matching cluster and subset tiles of the target image are placed together in a patchwork image such as the one shown at the top of FIG. 29, and the object-oriented segmentation is performed on the patchwork image.

In step 154, object characteristics of the objects segmented in step 153 are determined. For example, the object characteristics include the elliptical fit of the object, the average number of concavities on the perimeter of the object, the size of the object, the average color of the object, the average color of subobjects within the object, and the amount of intensity variation within the object. In step 155, a color is assigned to each of the object characteristics.

In step 156, pixelwise descriptors are generated that describe which of the object characteristics a characterized pixel most probably exhibits based on a quality of a second pixel at a predetermined offset from the characterized pixel. The pixelwise descriptors may also indicate the degree to which the characterized pixel exhibits a selected object characteristic. The pixelwise descriptors are generated in step 156 in a manner similar to that of step 36 of method 24. System 10 trains the pixelwise descriptors using multiple decision trees of pixelwise descriptors. The probability of a pixel exhibiting an object characteristic is the average of the probabilities output by the multiple decision trees of pixelwise descriptors. Each decision tree is trained on a different random set of pixels. The average result from multiple random forest decision trees provides a more accurate classification result.

In step 157, a pixel heat map is generated by applying the pixelwise descriptors to each pixel of the target digital image without segmenting the target digital image into objects. Each pixel of the target digital image has the color assigned to the object characteristic most probably exhibited by that pixel. Thus, the color of each pixel of the heat map is not based solely on the color or intensity of the pixel of the target image at the same location. Rather, the color of each pixel of the heat map is based on characteristics of other pixels at predetermined offsets from the pixel of the target image located at the corresponding position as the heat map pixel.

Finally in step 158, the pixel heat map is displayed on graphical user interface 14.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
dividing digital images of stained tissue of cancer patients into tiles;
separating the tiles into clusters whose tiles have pixel characteristics that are similar;
identifying a matching cluster of tiles whose pixel characteristics most closely match the pixel characteristics of a target digital image of stained tissue of a target patient;
segmenting the tiles of the matching cluster into objects;
determining object characteristics of the segmented objects;
assigning a color to each of the object characteristics;
generating pixelwise descriptors that describe which of the object characteristics a characterized pixel most probably exhibits based on a quality of a second pixel at a predetermined offset from the characterized pixel;
generating a pixel heat map by applying the pixelwise descriptors to each pixel of the target digital image without segmenting the target digital image into objects, wherein each pixel of the target digital image has the color assigned to the object characteristic most probably exhibited by that pixel; and
displaying the pixel heat map on a graphical user interface.

2. The method of claim 1, further comprising:
indicating a probability that each pixel of the target digital image exhibits a particular object characteristic by applying the pixelwise descriptors in a random forest decision tree.

3. The method of claim 1, wherein the pixel characteristics of only a predefined portion of each tile are used to identify the matching cluster of tiles.

4. The method of claim 1, wherein the pixel characteristics are taken from the group consisting of: a mean color vector of all pixels in an intermediate contrast region of a tile, a mean of the mean color vectors of individual tiles of a cluster, a standard deviation of the color vectors of the tiles of a cluster, and an l^2 Euclidean norm of the standard deviation of the color vectors of the tiles of a cluster.

5. The method of claim 1, wherein the stained tissue has been immunohistochemically stained for the expression of a protein.

6. The method of claim 1, wherein objects that exhibit a particular object characteristic belong to a class, and wherein the object characteristics are taken from the group consisting of: an average number of concavities of the objects of the class, an average size of the objects of the class, a variation in sizes of the objects of the class, an amount of intensity variation within the objects of the class, an elliptical fit of the objects of the class, and an average intensity of the objects of the class.

7. The method of claim 1, wherein a plurality of colors are assigned to each of the object characteristics depending on the degree of the object characteristic, and wherein each pixel of the target digital image has the color assigned to the degree to which that pixel exhibits the object characteristic.

8. The method of claim 1, wherein the quality of the second pixel at the predetermined offset from the characterized pixel is taken from the group consisting of: a color value of the second pixel, a difference between a color value of the second pixel and a color value of the characterized pixel, and a difference between an intensity value of the second pixel and an intensity value of the characterized pixel.

9. The method of claim 1, wherein the segmenting the tiles of the matching cluster into objects involves generating a data network in which objects are linked to selected pixels of the tiles.

10. The method of claim 1, wherein the separating the tiles into clusters having similar pixel characteristics involves successively separating the tiles into clusters until each cluster exhibits a standard deviation of color whose magnitude falls below a predetermined threshold.

11. A method comprising:
dividing digital images of stained tissue of cancer patients into tiles;
separating the tiles into clusters whose tiles have similar pixel characteristics;
identifying a matching cluster of tiles whose pixel characteristics most closely match the pixel characteristics of target tiles of a digital image of stained tissue of a target patient;
segmenting the target tiles and the tiles of the matching cluster into objects;
determining object characteristics of the segmented objects;
assigning a color to each of the object characteristics;
generating pixelwise descriptors that describe which of the object characteristics a characterized pixel most probably exhibits based on a quality of a second pixel at a predetermined offset from the characterized pixel;
generating a pixel heat map by applying the pixelwise descriptors to each pixel of the target digital image without segmenting the target digital image into objects, wherein each pixel of the target digital image has the color assigned to the object characteristic most probably exhibited by that pixel; and
displaying the pixel heat map on a graphical user interface.

12. The method of claim 11, wherein the pixelwise descriptors are generated using a random forest of decision trees applied to random different pixels of the target tiles and the tiles of the matching cluster.

13. The method of claim 11, wherein the stained tissue has been stained by hematoxylin and eosin (H&E).

14. The method of claim 11, wherein objects that exhibit a particular object characteristic belong to a class, and wherein the object characteristics are taken from the group consisting of: an average number of concavities of the objects of the class, an average size of the objects of the class, a variation in sizes of the objects of the class, an amount of intensity variation within the objects of the class, an elliptical fit of the objects of the class, and an average intensity of the objects of the class.

15. The method of claim 11, wherein the quality of the second pixel at the predetermined offset from the characterized pixel is taken from the group consisting of: a color value of the second pixel, a difference between a color value of the second pixel and a color value of the characterized pixel, and a difference between an intensity value of the second pixel and an intensity value of the characterized pixel.

16. A method comprising:
dividing digital images of stained tissue of cancer patients into tiles;
identifying clusters of tiles whose pixel characteristics are similar;
identifying a matching cluster of tiles whose pixel characteristics most closely match the pixel characteristics of a target digital image of stained tissue of a target patient, wherein the pixel characteristics used to identify the matching cluster of tiles are determined only from regions on the tiles that exhibit an intermediate degree of local contrast;
segmenting the tiles of the matching cluster into objects;
determining object characteristics of the objects;
generating pixelwise descriptors that describe which of the object characteristics a characterized pixel most probably exhibits based on a quality of a second pixel at a predetermined offset from the characterized pixel; and
generating a pixel heat map by applying the pixelwise descriptors to each pixel of the target digital image without segmenting the target digital image into objects, wherein each pixel of the target digital image has a color assigned to the object characteristic most probably exhibited by that pixel.

17. The method of claim 16, wherein the color assigned to the object characteristic is taken from the group consisting of: a color assigned to pixels that likely belong to round healthy cells, a color assigned to pixels that likely belong to irregularly shaped cancerous cells, a color assigned to pixels that likely belong to nuclei containing textured DNA, and a color assigned to pixels that likely belong to nuclei whose DNA is homogeneously disbursed.

18. The method of claim 16, wherein the object characteristics are taken from the group consisting of: an average number of concavities of the objects, an average size of the objects, a variation in sizes of the objects, an amount of intensity variation within the objects, an elliptical fit of the objects, and an average intensity of the objects.

19. The method of claim 16, wherein the stained tissue has been stained by hematoxylin and eosin (H&E).

20. The method of claim 16, wherein the stained tissue has been immunohistochemically stained for the expression of a protein.

* * * * *